United States Patent
Kobayashi

(10) Patent No.: US 12,132,872 B2
(45) Date of Patent: Oct. 29, 2024

(54) INFORMATION PROCESSING SYSTEM USING MOBILE TERMINAL WITH VOICE RECOGNITION AS USER INTERFACE, INFORMATION PROCESSING APPARATUS, CONTROL METHOD, AND STORAGE MEDIUM

(71) Applicant: CANON KABUSHIKI KAISHA, Tokyo (JP)

(72) Inventor: Yo Kobayashi, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/307,898

(22) Filed: Apr. 27, 2023

(65) Prior Publication Data
US 2024/0080395 A1 Mar. 7, 2024

(30) Foreign Application Priority Data
May 6, 2022 (JP) .................... 2022-076610

(51) Int. Cl.
H04N 1/00 (2006.01)
H04N 1/327 (2006.01)

(52) U.S. Cl.
CPC ..... *H04N 1/00403* (2013.01); *H04N 1/32776* (2013.01)

(58) Field of Classification Search
None
See application file for complete search history.

(56) References Cited

U.S. PATENT DOCUMENTS

| | | | | |
|---|---|---|---|---|
| 10,506,115 B2* | 12/2019 | Kodimer | ............... | G06F 3/1204 |
| 11,778,107 B2* | 10/2023 | Morba | ................. | G06F 3/1284 |
| | | | | 358/1.15 |
| 2002/0054330 A1* | 5/2002 | Jinbo | .................... | G06F 3/1229 |
| | | | | 358/1.15 |
| 2006/0227371 A1* | 10/2006 | Roksz | ................... | G06F 21/608 |
| | | | | 358/1.14 |
| 2010/0144376 A1* | 6/2010 | Pawlecki | ............. | H04W 4/029 |
| | | | | 358/1.15 |

(Continued)

FOREIGN PATENT DOCUMENTS

JP 2019092153 A 6/2019

*Primary Examiner* — Akwasi M Sarpong
*Assistant Examiner* — Pawan Dhingra
(74) *Attorney, Agent, or Firm* — ROSSI, KIMMS & McDOWELL LLP

(57) ABSTRACT

An information processing system includes an image forming apparatus and a mobile terminal capable of performing wired or wireless communication with the image forming apparatus. A voice recognition application is installed in the mobile terminal. The image forming apparatus includes a pedestal to which the mobile terminal is attached, a motion sensor that starts operating when the mobile terminal is attached to the pedestal to detect whether a person is coming close, and a CPU that instructs, when it is determined based on a result of the detection that a user has come close to use the image forming apparatus, the mobile terminal to start the voice recognition application or operate the same in the foreground. The mobile terminal includes a voice output section configured to notify a user that the mobile terminal is capable of responding to voice input, when the instruction is received.

7 Claims, 16 Drawing Sheets

(56) References Cited

U.S. PATENT DOCUMENTS

| | | | | |
|---|---|---|---|---|
| 2012/0194867 A1* | 8/2012 | Appleyard | ............. | H04W 4/16 |
| | | | | 358/1.15 |
| 2019/0306342 A1* | 10/2019 | Kodimer | ............... | G06F 3/1292 |
| 2021/0037147 A1* | 2/2021 | Morba | .................. | G06F 3/1272 |

* cited by examiner

FIG. 12

| bmRequestType | 01000000b |
|---|---|
| bRequest | 0x01 |
| wValue | 0x0001(START OF VOICE RECOGNITION APPLICATION) 0x0002(ACTIVATION OF VOICE RECOGNITION APPLICATION) |
| wIndex | 0x0000 |
| wLength | 0x0000 |

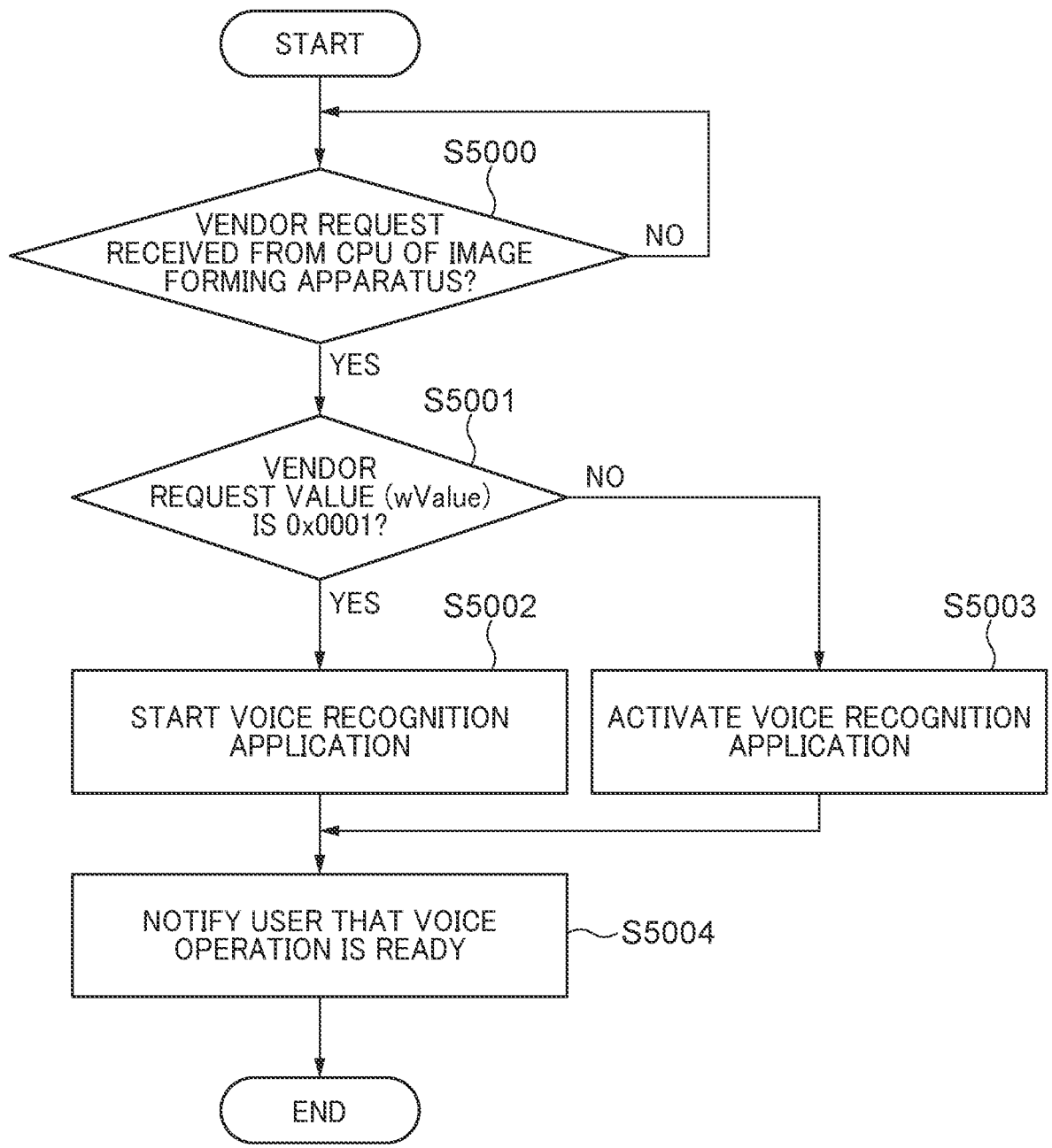

INFORMATION PROCESSING SYSTEM USING MOBILE TERMINAL WITH VOICE RECOGNITION AS USER INTERFACE, INFORMATION PROCESSING APPARATUS, CONTROL METHOD, AND STORAGE MEDIUM

BACKGROUND OF THE INVENTION

Field of the Invention

The present invention relates to an information processing system, an information processing apparatus, a control method, and a storage medium, and more particularly to an information processing system that receives a user operation using a mobile terminal as a user interface, an information processing apparatus, a control method, and a storage medium.

Description of the Related Art

In recent years, there has appeared a system that controls another information processing apparatus using a mobile terminal, such as a smartphone, as a user interface. Examples of the system include a system that causes a smartphone and a multi-function peripheral (MFP) to communicate with each other whereby an image or document stored in the smartphone is printed by the MFP using an application operating on the smartphone.

Recently, a system that allows a user to control a mobile terminal or another information processing apparatus using a voice function to thereby cause the mobile terminal or information processing apparatus to execute desired processing. For such a system, there has been proposed a technique of controlling a timing at which the mobile terminal or the other information processing apparatus enable the voice function to thereby achieve improvement of the convenience of a user, such as reduction of an operation waiting time of the user.

For example, Japanese Laid-Open Patent Publication (Kokai) No. 2019-92153 discloses a technique in which when an MFP determines, based on the intensity of radio waves output from a mobile terminal carried by a user, that the user has come close to the MFP, the MFP establishes data communication using wireless communication with the mobile terminal and enables the voice function of the self-apparatus.

However, in the technique disclosed in Japanese Laid-Open Patent Publication (Kokai) No. 2019-92153, the voice function of the MFP can be enabled only in a case where the user carries the mobile terminal. In other words, for example, in a case where the mobile terminal is attached to the MFP, even when the user comes close to the MFP, the voice function of the MFP cannot be enabled at a timing at which the user comes close to the MFP. Further, since the proximity of the user is determined based on the intensity of radio waves, this causes a problem that even in a case where the user does not intend to use the voice function of the MFP, when the user comes close to the MFP without intending to use the MFP, the voice function of the MFP is enabled.

SUMMARY OF THE INVENTION

The present invention provides an information processing system using a mobile terminal as a user interface, which is capable of making a voice function available for a user without erroneously detecting proximity of the user, an information processing apparatus, a control method, and a storage medium.

In a first aspect of the present invention, there is provided an information processing system including an information processing apparatus and a mobile terminal that is capable of performing wired or wireless communication with the information processing apparatus, wherein a voice recognition application is installed in the mobile terminal, wherein the information processing apparatus includes an attachment section to which the mobile terminal is attached, a sensor that starts operating when the mobile terminal is attached to the attachment section to detect whether or not a person is coming close thereto, and an instruction unit configured to instruct, when it is determined based on a result of the detection performed by the sensor that a user has come close to use the information processing apparatus, the mobile terminal attached to the attachment section to start the voice recognition application or operate the voice recognition application in the foreground, and wherein the mobile terminal includes a first notification unit configured to notify the user that the mobile terminal is capable of responding to voice input, when the instruction is received.

In a second aspect of the present invention, there is provided an information processing apparatus that is capable of performing wired or wireless communication with a mobile terminal in which a voice recognition application is installed, including an attachment section to which the mobile terminal is attached, a sensor that starts operating when the mobile terminal is attached to the attachment section to detect whether or not a person is coming close thereto, and an instruction unit configured to instruct, when it is determined based on a result of the detection performed by the sensor that a user has come close to use the information processing apparatus, the mobile terminal attached to the attachment section to start the voice recognition application or operate the voice recognition application in the foreground.

In a third aspect of the present invention, there is provided a method of controlling an information processing apparatus that is capable of performing wired or wireless communication with a mobile terminal in which a voice recognition application is installed, and includes an attachment section to which the mobile terminal is attached, and a sensor that starts operating when the mobile terminal is attached to the attachment section to detect whether or not a person is coming close thereto, the method including determining based on a result of the detection performed by the sensor whether or not a user has come close to use the information processing apparatus, and instructing, when it is determined that the user has come close to use the information processing apparatus, the mobile terminal attached to the attachment section to start the voice recognition application or operate the voice recognition application in the foreground.

According to the present invention, it is possible to make the voice function available for a user without erroneously detecting proximity of the user.

Further features of the present invention will become apparent from the following description of exemplary embodiments (with reference to the attached drawings).

BRIEF DESCRIPTION OF THE DRAWINGS

FIG. 12 is a diagram showing details of a vendor request used in the information processing system according to the first embodiment.

FIG. 16 is a flowchart of a process performed by a CPU of the mobile terminal when a vendor request transmitted in one of steps in FIG. 15 is received.

DESCRIPTION OF THE EMBODIMENTS

The present invention will now be described in detail below with reference to the accompanying drawings showing embodiments thereof. However, the component elements described in the following embodiment are described only by way of example, and are by no means intended to limit the scope of the present invention to them alone.

Figure 1:
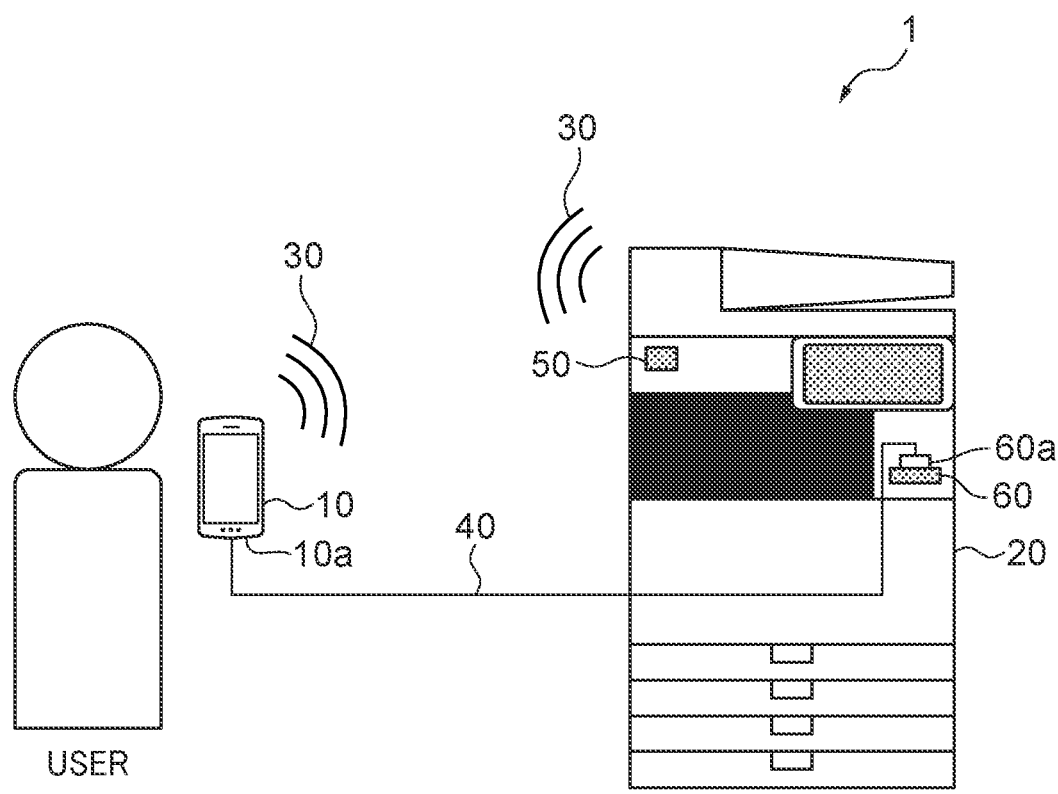
FIG. 1 is a schematic configuration diagram of an information processing system according to a first embodiment of the present invention, which controls an image forming apparatus as an information processing apparatus, using a mobile terminal carried by a user.

FIG. 1 is a schematic configuration diagram of an information processing system 1 according to a first embodiment of the present invention, which controls an image forming apparatus 20 as an information processing apparatus, using a mobile terminal 10 carried by a user.

Although in the present embodiment, the description will be given of a case where the mobile terminal 10 is a smartphone, the mobile terminal 10 is only required to be an information processing apparatus that is capable of communicating with the image forming apparatus 20, portable, and equipped with a microphone function, and may be e.g. a tablet terminal. More specifically, in the present embodiment, in the information processing system 1, a user operates a voice recognition application for the image forming apparatus 20, which is installed in the mobile terminal 10, to thereby transmit data stored in the mobile terminal 10 to the image forming apparatus 20. With this, printing is executed by the image forming apparatus 20 as described below.

Here, the voice recognition application installed in the motile terminal 10 provides a function that enables recognition of a voice uttered by a user and performs feedback control of the image forming apparatus 20 by an utterance of the user. For example, when the user talks "print two copies of this document" to the mobile terminal 10, the voice recognition application executes extraction of words and generation of a job command such that the image forming apparatus 20 can execute a "print" job for "2 copies". Details of the operation of voice processing performed by the voice recognition application of the mobile terminal 10 will be described hereinafter.

The mobile terminal 10 and the image forming apparatus 20 are connected by wireless communication means 30 or wired communication means 40. As the wireless communication means 30, the mobile terminal 10 and the image forming apparatus 20 are each equipped with a plurality of communication means which are different in wireless communicable distance, such as Wi-Fi and Bluetooth (registered trademark). The wired communication means 40 is an extension universal serial bus (USB) cable which is connected to USB cables which are accommodated within the mobile terminal 10 and the image forming apparatus 20, respectively. More specifically, from a pedestal 60 (attachment section) of the image forming apparatus 20, there protrudes a connector 60a of a wired communication section 408 (see FIG. 5) accommodated inside the pedestal 60. On the other hand, a bottom of the mobile terminal 10 is formed with a connector 10a of a wired communication section 208 (see FIG. 4) accommodated inside the bottom such that the connector 60a can be inserted into the connector 10a. In FIG. 1, the extension USB cable as the wired communication means 40 has one end attached to the connector 10a of the mobile terminal 10, and the other end attached to the connector 60a of the image forming apparatus 20. In FIG. 1, the image forming apparatus 20 serves as a USB host, and the mobile terminal 10 operates as a USB device. At this time, a debug function equipped in the mobile terminal 10 is enabled as in a known technique for communication between an automotive navigation system and a mobile terminal. With this, the mobile terminal 10 operates as the USB device, and the voice recognition application can be controlled from the image forming apparatus 20 as the host. As a matter of course, the mobile terminal 10 may be a smart speaker or the like which communicates with the image forming apparatus 20 by wireless communication (Bluetooth, near field communication (NFC), and Wi-Fi), and further, communication with the image forming apparatus 20 may be performed using the Ethernet instead of the USB. Further, in the information processing system 1, the mobile terminal 10 may be set as the USB host, and the image forming apparatus may be operated as the USB device.

The image forming apparatus 20 further includes a person detection section 50 (sensor). The person detection section 50 is e.g. a motion sensor. The person detection section 50 of the present embodiment uses an ultrasonic method as a detection method of the motion sensor. Note that the detection method of the person detection section 50 is not limited to the ultrasonic method insofar as it is a method which can detect a person. For example, the person detection section 50 may use an infrared method or a method of detecting a person based on a recognition result obtained from an image captured by a camera, not shown.

Figure 2:
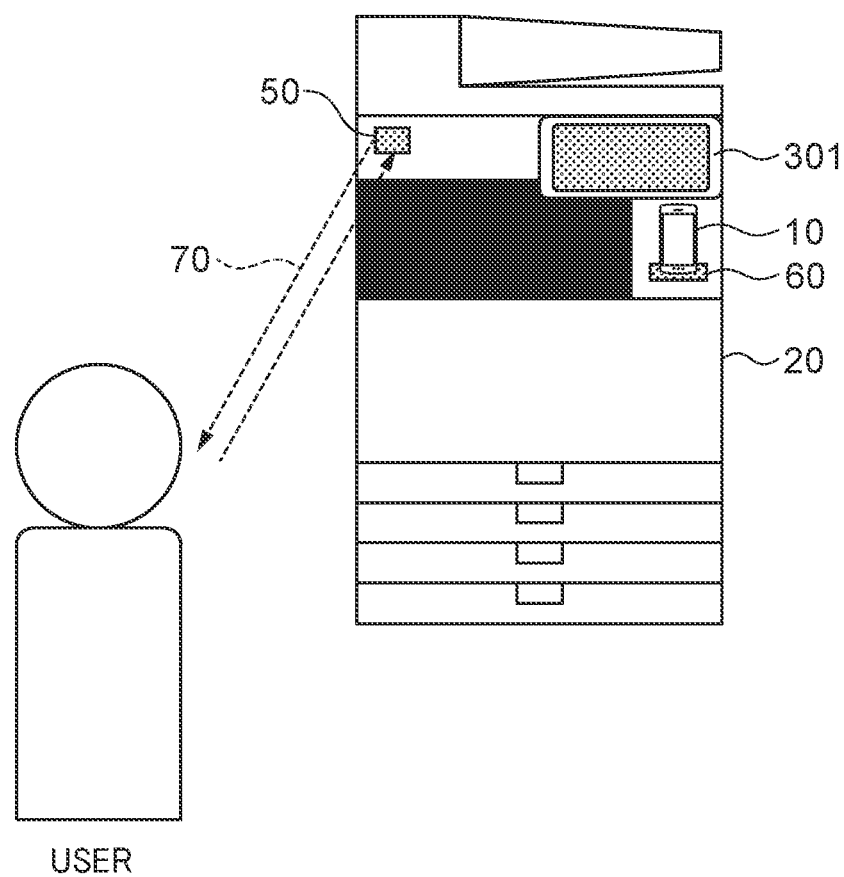
FIG. 2 is a diagram useful in explaining a case where the mobile terminal is attached to the image forming apparatus.

FIG. 2 is a diagram useful in explaining a case where the mobile terminal 10 is attached to the image forming apparatus 20.

The mobile terminal 10 and the image forming apparatus 20 are connected by the wired communication means 40, not shown in FIG. 2, and the mobile terminal 10 is attached to the pedestal 60 of the image forming apparatus 20. In the present embodiment, the wired communication section 408 (see FIG. 5) (such as a USB cable) is accommodated inside the pedestal 60, and an end of the wired communication section 408 protrudes as the connector 60a (see FIG. 1) from which power supply is supplied and with which signals are exchanged, such that the connector 60a can be inserted into the connector 10a of the mobile terminal 10.

When a user comes close to the image forming apparatus 20, output waves of ultrasonic waves 70 output from the person detection section 50 are reflected from the user, and the reflected waves are input to the person detection section 50. The person detection section 50 periodically outputs the output waves, and whenever the reflected waves are input, the person detection section 50 transmits to a console section 301 a notification including information on a time at which the output waves were output and a time at which the reflected waves were input. Whenever this notification is received, a CPU 406 (see FIG. 4) of the console section 301 of the image forming apparatus 20 measures a time interval between the times. In a case where the measured time interval is shorter than a predetermined time period, and the notification is repeatedly received from the person detection section 50 for a predetermined time period or longer, the CPU 406 determines that the user is coming closer to the image forming apparatus 20 because the user intends to use the image forming apparatus 20.

Here, in the information processing system 1, the image forming apparatus 20 can also communicate with the mobile terminal 10 via the extension USB cable as shown in FIG. 1. However, in the present embodiment, as shown in FIG. 2, the description is given of a case where the connector 10a of the mobile terminal 10 is directly attached to the connector 60a of the image forming apparatus 20 to perform USB communication without using the extension USB cable.

Figure 3:
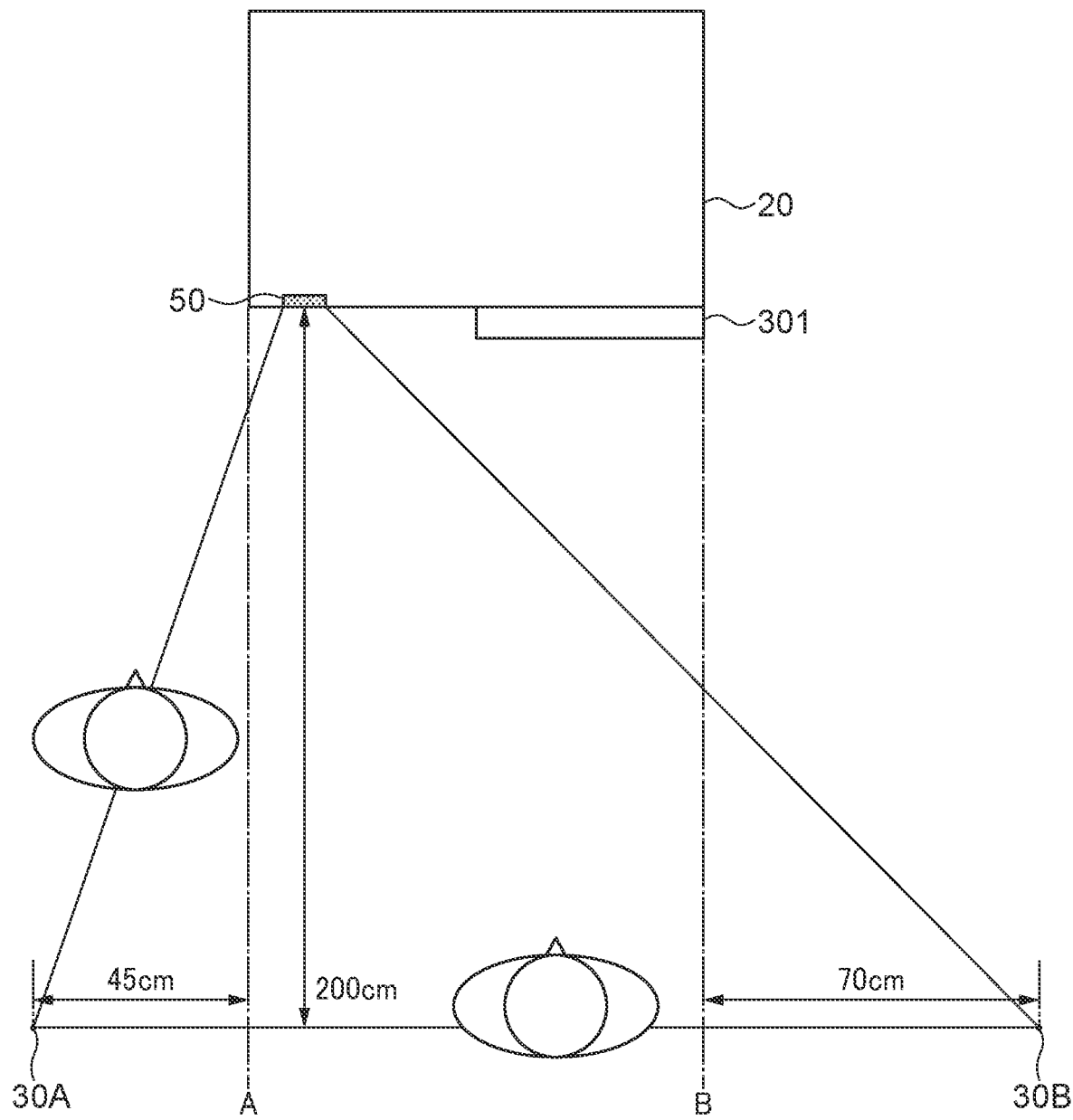
FIG. 3 is an overhead view showing a distance and a range within which a person detection section of the image forming apparatus, appearing in FIG. 1, can detect a user.

FIG. 3 is an overhead view showing a distance and a range within which the person detection section 50 of the image forming apparatus 20 can detect a user. FIG. 3 is an overhead view of the image forming apparatus 20 and a user, as viewed from the above.

First, the detection distance will be described. The maximum linear detection distance from the front of the image forming apparatus 20 is 200 cm. Further, the ultrasonic waves 70 output from the person detection section 50 propagate in the air while spreading at some angle, and hence the person detection section 50 can detect a user, up to a position 30A shifted further toward the left by 45 cm from a line A drawn from the left end of the image forming apparatus 20, as shown in FIG. 3. Similarly, the person detection section 50 can detect a user, up to a position 30B further shifted toward the right by 70 cm from a line B drawn from the right end of the image forming apparatus 20, as shown in FIG. 3. However, the detection distance of the person detection section 50 and the radiation angle of the ultrasonic waves 70 are illustrated by way of example, and are not limited to the case in the present embodiment. With the configuration shown in FIG. 3, in the present embodiment, it is possible to detect a user within a range indicated by solid lines extending from the person detection section 50 appearing in FIG. 3 and a line segment connecting between the positions 30A and 30B.

Figure 4:
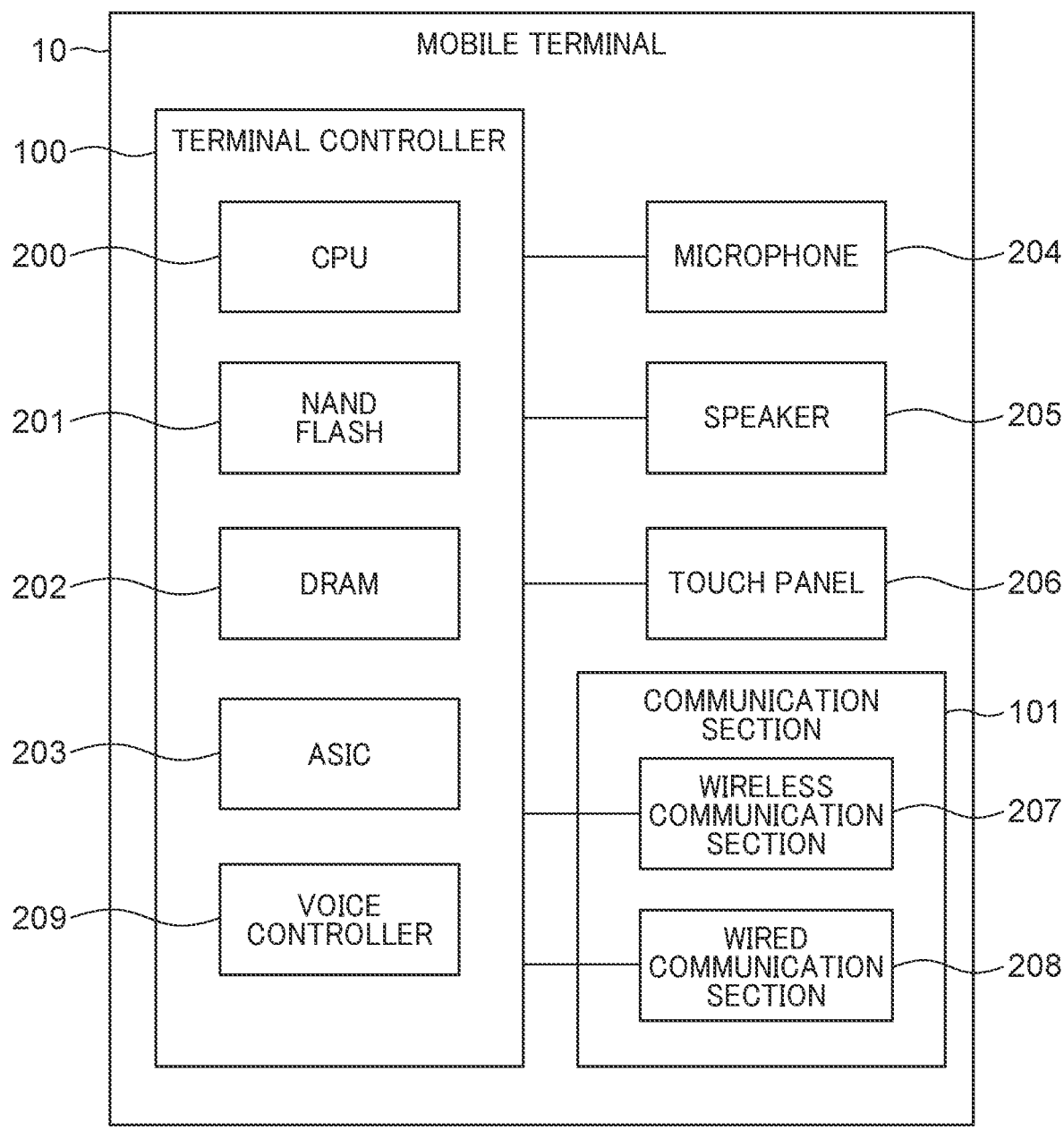
FIG. 4 is a block diagram showing a hardware configuration of the mobile terminal.

FIG. 4 is a block diagram showing a hardware configuration of the mobile terminal 10.

The mobile terminal 10 is roughly comprised of a terminal controller 100, a communication section 101, and a microphone 204, a speaker 205, and a touch panel 206, which are necessary as a user interface of the smartphone.

The terminal controller 100 performs arithmetic processing of information for the mobile terminal 10, control of the communication section 101, and control of the above-mentioned user interface (the microphone 204, the speaker 205, and the touch panel 206). Further, the terminal controller 100 stores a result of execution of the arithmetic processing of information, and so forth. More specifically, the terminal controller 100 includes a CPU 200, a NAND flash 201, a dynamic random access memory (DRAM) 202, an ASIC 203, and a voice controller 209.

The CPU is an abbreviation of the central processing unit, and has a function of executing arithmetic processing of information for the mobile terminal 10. The CPU 200 loads an operating system (OS) stored in the NAND flash 201 as a nonvolatile memory into the DRAM 202 as a volatile memory, and executes a variety of arithmetic processing of information, following an operation of the OS. Information, such as settings of the mobile terminal 10, is stored in the NAND flash 201, and temporary parameters used for arithmetic processing, and so forth, are stored in the DRAM 202.

Here, the NAND flash 201 is a semiconductor storage device, such as an embedded multimedia card (eMMC). The NAND flash 201 is a high-capacity memory that is capable of storing not only the above-mentioned OS, but also downloaded document data and image data.

The ASIC is an abbreviation of the application specific integrated circuit and mainly responsible for power control of the mobile terminal 10, and realizes low power consumption by controlling a power supply circuit, not shown, according to the use condition of the mobile terminal 10. The ASIC 203 is equipped with a graphic processing unit (GPU) and performs, besides the power control, processing of drawing data to be displayed on the touch panel 206 of the mobile terminal 10.

The terminal controller 100 is connected to the communication section 101, receives data which is received by the communication section 101 from an external apparatus, and executes arithmetic processing of information. Further, to transmit a result of the arithmetic processing of information to the external apparatus, the terminal controller 100 passes data as the result of the arithmetic processing of information to the communication section 101.

The communication section 101 includes a wireless communication section 207 and a wired communication section 208. The wireless communication section 207 performs communication according to a communication method compliant with a communication standard, such as Wi-Fi or Bluetooth. The wireless communication section 207 communicates with an external apparatus (e.g. the image forming apparatus 20) compliant with the same communication standard to exchange data using radio waves. On the other hand, the wired communication section 208 is connected to an external apparatus (e.g. the image forming apparatus 20) directly as shown in FIG. 2, or via the USB extension cable as the wired communication means 40 as shown in FIG. 1 to exchange data using electrical signals. In the present embodiment, the wireless communication section 207 can perform communication using Wi-Fi or Bluetooth, and the wired communication section 208 can perform communication using the USB.

The microphone 204 and the speaker 205 are voice input/output interfaces with a user. Further, the touch panel 206 receives a change of settings of the mobile terminal 10 and an instruction for executing an application, which are input by a user using a finger or pen.

The voice controller 209 is a controller connected to the microphone 204 and the speaker 205, for controlling voice data input and output to and from the mobile terminal 10 via the microphone 204 and the speaker 205. Voice input from the microphone 204 is encoded by the voice controller 209 and is loaded into the DRAM 202 by the CPU 200. Further, the voice controller 209 decodes encoded output voice data to generate analog voice signals according to the control of the CPU 200 and transmits the voice signals to the speaker 205.

Figure 5:
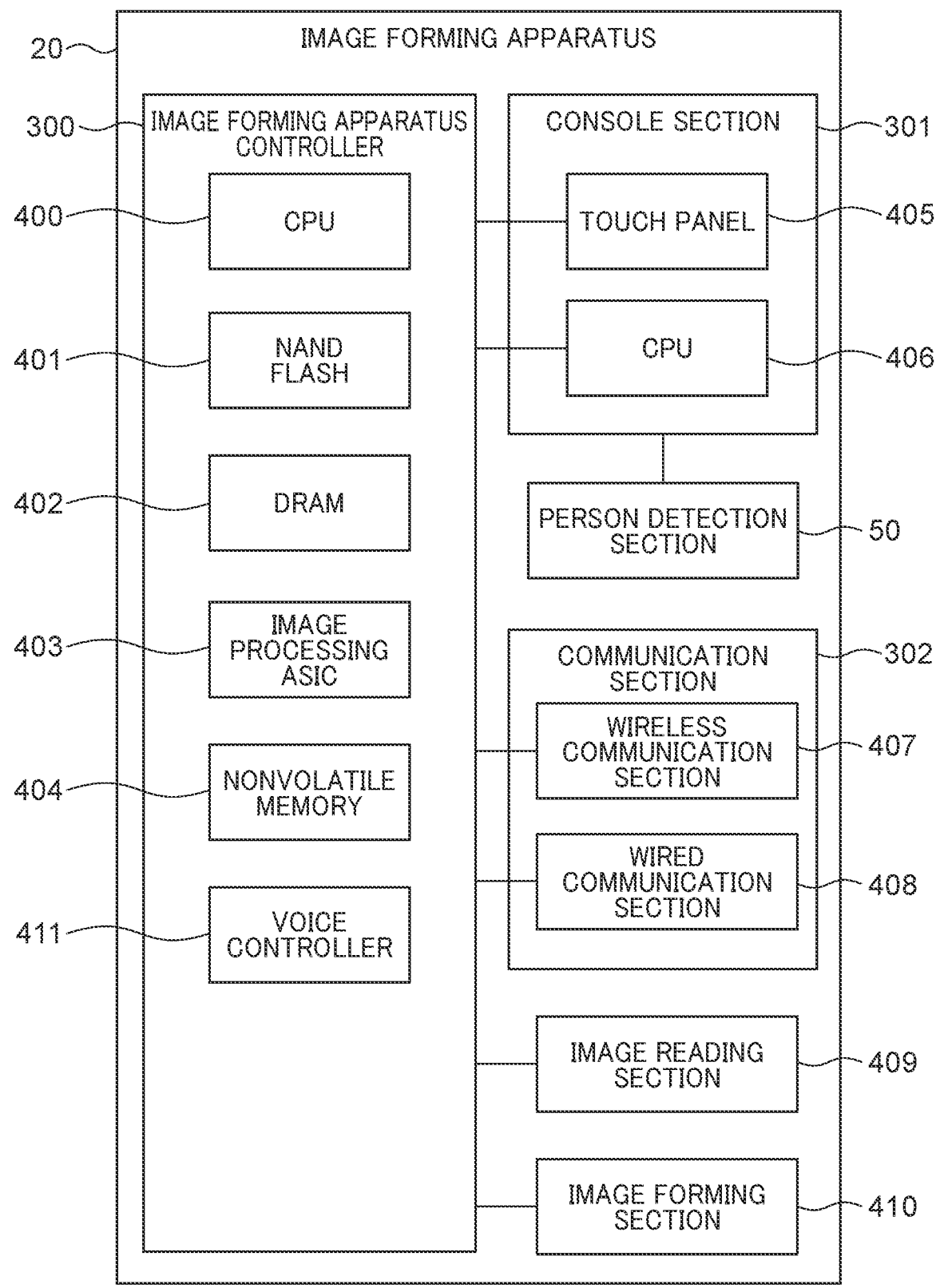
FIG. 5 is a block diagram showing a hardware configuration of the image forming apparatus.

FIG. 5 is a block diagram showing a hardware configuration of the image forming apparatus 20.

The image forming apparatus 20 is roughly comprised of an image forming apparatus controller 300, the console section 301, a communication section 302, an image reading section 409, an image forming section 410, and the person detection section 50.

The image forming apparatus controller 300 mainly performs arithmetic processing of information for the image forming apparatus 20 and image processing. For example, the image forming apparatus controller 300 performs correction of image data input from the image reading section 409, control of the power state of the image forming apparatus 20 based on an instruction of a user, which is input from the console section 301, arithmetic processing based on data received from and data to be transmitted to the communication section 302, and so forth. More specifically, the image forming apparatus controller 300 includes a CPU 400, a NAND flash 401, a DRAM 402, an image processing ASIC 403, a nonvolatile memory 404, and a voice controller 411.

The CPU 400 mainly executes the above-mentioned arithmetic processing of information. The CPU 400 is connected to the console section 301 and the communication section 302. Further, similar to the mobile terminal 10, the CPU 400 executes the arithmetic processing of information according to an OS stored in the NAND flash 401 and loads a result of the arithmetic processing in the DRAM 402. As the NAND flash 401, not a nonvolatile memory, such as an eMMC used in the mobile terminal 10, but a higher-capacity solid state drive (SSD) may be used. Further, instead of the NAND flash 401, a storage device which is not a semiconductor storage device, such as a hard disk drive (HDD), may be used. Further, the CPU 400 also executes power control of a wireless communication section 407 and the wired communication section 408 of the communication section 302.

The image processing ASIC 403 is an ASIC specific to image processing performed on a print description language (PDL) and an original image, which are input from the communication section 302 and the image reading section 409. For example, the image processing ASIC 403 generates output data of higher definition by separating character part and image part of an image formed by scanning an original by the image reading section 409 and performing image processing suitable for each part. Note that in the present embodiment, the CPU 400 and the image processing ASIC 403 are connected by a bus, not shown.

The nonvolatile memory 404 is a memory provided separately from the NAND flash 401 in the image forming apparatus controller 300. Note that in the present embodiment, the nonvolatile memory 404 is connected to the CPU 400 via the bus, not shown. The nonvolatile memory 404 is a semiconductor storage device for storing information, such as an installation location of the image forming apparatus 20, described hereinafter, which can be set and changed only by a user (including a service person) of the image forming apparatus 20. In the present embodiment, from a viewpoint of security, the nonvolatile memory 404 encodes data received from the CPU 400 thereinside and stores the encoded data.

The voice controller 411 receives a job command from the CPU 400, which is transmitted from the mobile terminal 10 by wired communication, in the present embodiment. As a matter of course, in a case where the image forming apparatus 20 and the mobile terminal 10 are wirelessly connected, the voice controller 411 transmits and receives a job command by wireless communication. The voice controller 411 performs processing for converting the received job command to data which can be executed by the image forming apparatus 20, and transmits the data to the CPU 400 to thereby cause the image forming apparatus 20 to execute the job, such as a print job. Further, the voice controller 411 also has a function of generating response data so as to feed back an operation status and an instruction to a user via the speaker 205 of the mobile terminal 10. Details of this function will be described hereinafter.

The console section 301 is a user interface used by a user to control the image forming apparatus 20 and includes a touch panel 405, the CPU 406, and an LED, and a buzzer, none of which are shown. The touch panel 405 receives a change of settings, including print settings, settings of the power state, and settings of communication of the image forming apparatus 20, according to a user's screen operation. The CPU 406 receives drawing data from the CPU 400 of the image forming apparatus controller 300, displays the received data on the touch panel 405, and transmits data of coordinates where a user presses on the touch panel 405 to the CPU 400. Further, the CPU 406 is used for control of blinking of the LED, not shown, control of a notification sound of the buzzer, not shown, notifying the completion of a print job to a user, and so forth.

Further, the CPU 406 performs control of the person detection section 50. More specifically, the CPU 406 performs the above-mentioned control of the ultrasonic waves 70 and determination of whether or not a user is coming close to the image forming apparatus 20 based on a time difference between an input and an output of the ultrasonic waves 70. Although in the present embodiment, the CPU 406 performs these processing operations, the CPU 400 may be caused to perform these processing operations.

Similar to the mobile terminal 10, the communication section 302 includes the wireless communication section 407 and the wired communication section 408. The wireless communication section 407 (wireless communication function) performs communication by a communication method compliant with a communication standard, such as Wi-Fi, NFC, and Bluetooth. The wireless communication section 207 communicates with an external apparatus (such as the mobile terminal 10) compliant with the same communication standard so as to exchange data using radio waves. On the other hand, the wired communication section 408 (wired communication function) is connected to an external apparatus (e.g. the mobile terminal 10) directly as shown in FIG. 2 or via the USB extension cable as the wired communication means 40 as shown in FIG. 1 to transmit and receive data using electrical signals. In the present embodiment, the wireless communication section 407 can perform communication using Wi-Fi, NFC, and Bluetooth, and the wired communication section 408 can perform communication using the USB and the Ethernet. However, as mentioned above, in the present embodiment, the information processing system 1 has the connector 10a of the mobile terminal 10 directly attached to the connector 60a of the image forming apparatus 20, whereby communication using the USB is performed between the mobile terminal 10 and the image forming apparatus 20.

The user can set whether to enable or disable the wireless communication section 407 and the wired communication section 408, as desired. For example, the user can make a setting for enabling only the wired communication section 408 and disabling the wireless communication section 407, or a setting for enabling both of the wireless communication section 407 and the wired communication section 408.

The image reading section 409 has a function of scanning an original of a paper medium and converting the scanned image such that each pixel has a data amount of red (R), green (G), or blue (B).

The image forming section 410 has a function of applying toners of respective colors onto photosensitive drums, not shown, based on the data amounts of the respective colors of yellow (Y), magenta (M), cyan (C), and kuro (K) (which means black in Japanese), output from the image processing ASIC 403, and transferring the resulting toner image onto paper.

The image reading section 409 and the image forming section 410 are connected to the image processing ASIC 403 via wiring, not shown.

Here, a voice function of the mobile terminal 10 will be described with reference to FIG. 6.

Figure 6:
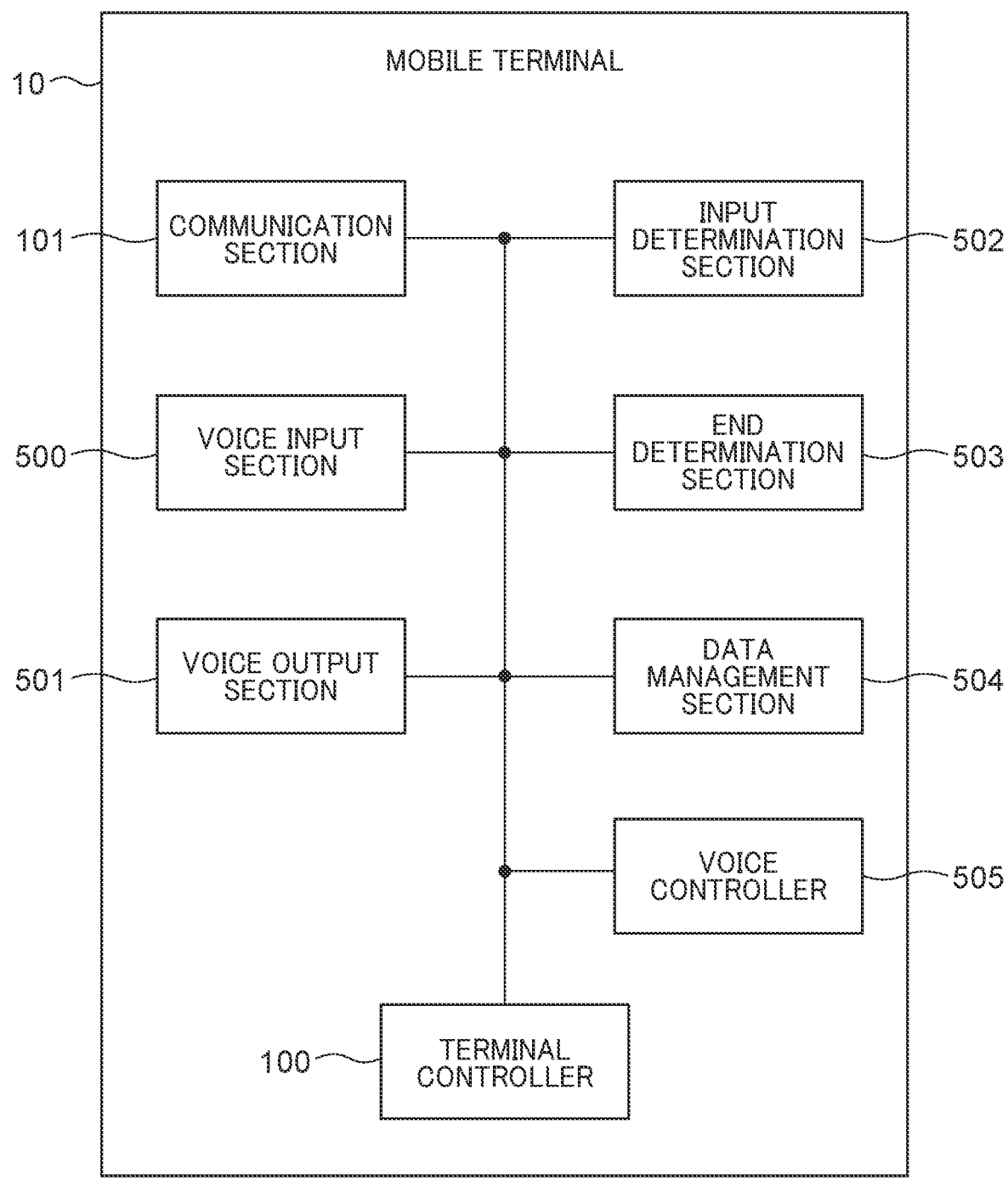
FIG. 6 is a functional block diagram related to a voice function of the mobile terminal.

FIG. 6 is a functional block diagram related to the voice function of the mobile terminal 10.

As shown in FIG. 6, the voice function of the mobile terminal 10 is comprised of the respective functional blocks of the terminal controller 100, the communication section 101, a voice input section 500, a voice output section 501, an input determination section 502, an end determination section 503, a data management section 504, and a voice controller 505. These functional blocks are each realized e.g. by the CPU 200 of the mobile terminal 10, which executes an associated computer program while cooperating with other hardware modules.

The communication section 101 transmits and receives data to and from an external apparatus, such as the image forming apparatus 20, by using wired or wireless communication as mentioned above. Here, the communication section 101 mainly transmits a job command generated from user's voice input to the mobile terminal 10, to the image forming apparatus 20, and receives response data from the image forming apparatus 20. In the present embodiment, these transmission and reception operations are performed by USB communication between the connector 60a of the image forming apparatus 20 and the connector 10a of the mobile terminal 10, which is directly attached to the connector 60a.

The voice input section 500 converts an analog voice signal of voice, acquired by the microphone 204, to voice data, loads the voice data into the DRAM 202, and temporarily stores the voice data. Further, the voice input section 500 may shape the input voice data according to a voice file format, such as the MP3 format.

The voice output section 501 reproduces an output voice expressed by voice-synthesized data generated by the voice controller 505, using the voice controller 209 and the speaker 205.

The input determination section 502 and the end determination section 503 determine the start and end of voice input of a user, respectively. For example, the input determination section 502 determines the start of voice input when an icon having a shape of the microphone, which is displayed on the touch panel 206 by the voice recognition application, is pressed. Besides this, the input determination section 502 may determine the start of voice input, by recognition of a wake word, which is a known technique, or detection of a change in input voice level. Further, for example, similar to the input determination section 502, the end determination section 503 determines the end of voice input when the icon displayed on the touch panel 206 by the voice recognition application is pressed again. Besides this, the end determination section 503 may determine the end of voice input in a case where no voice has been input from a user for a predetermined time period. Further, the end determination section 503 may determine the end of voice input upon detection of a user's utterance of a key word indicative of the end of voice input, which is set in advance.

The data management section 504 is used for managing user authentication data, temporarily buffering voice data input from the voice input section 500, and so forth.

Here, the voice controller 505 as one of the functional blocks of the mobile terminal 10 will be described in detail with reference to FIG. 7.

Figure 7:
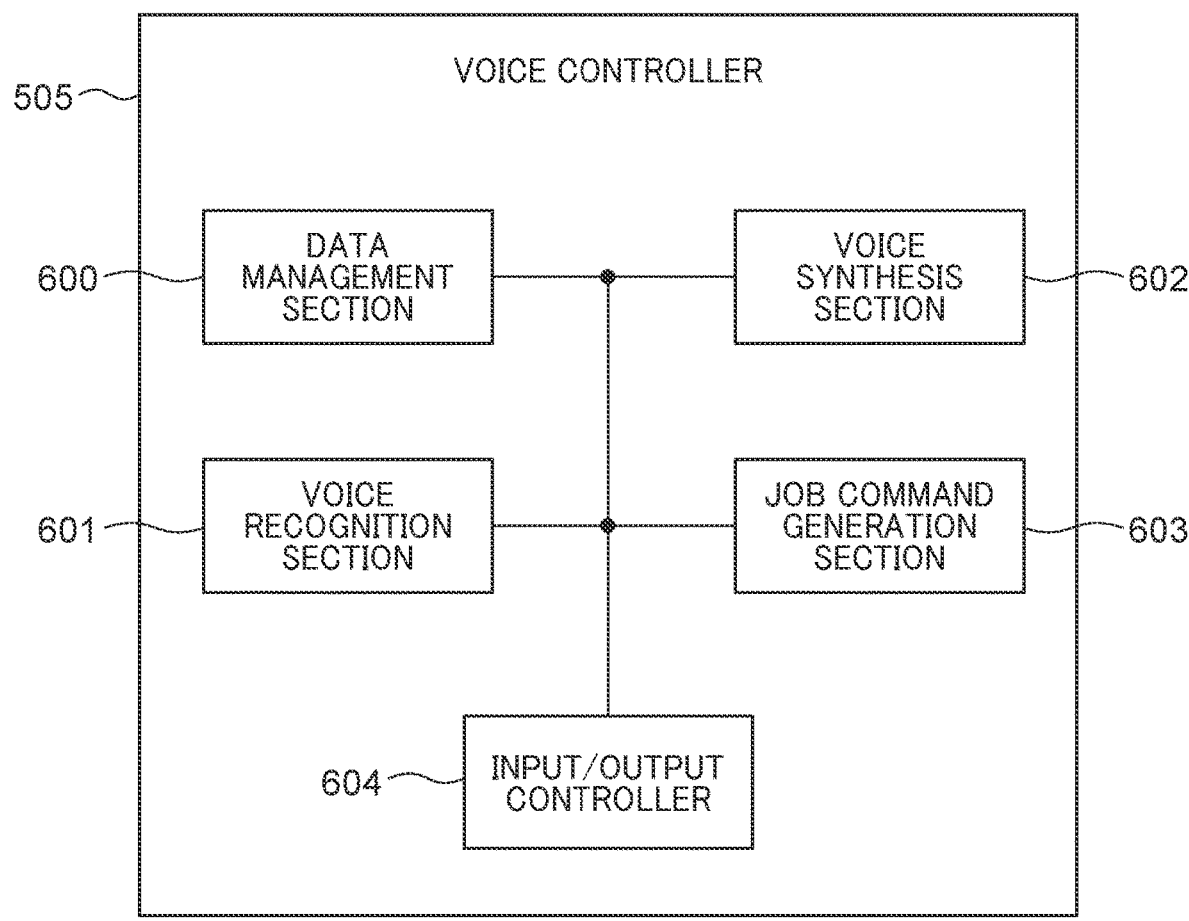
FIG. 7 is a detailed functional block diagram of a voice controller of the mobile terminal shown in FIG. 6.

FIG. 7 is a detailed functional block diagram of the voice controller 505 of the mobile terminal 10.

The voice controller 505 is comprised of a data management section 600, a voice recognition section 601, a voice synthesis section 602, a job command generation section 603, and an input/output controller 604.

The data management section 600 manages data necessary for voice recognition and voice synthesis performed by the mobile terminal 10. For example, the data management section 600 manages e.g. a sound model, a language model, and word dictionary data, which are used for converting input voice data to text data as a result of voice recognition. While the data management section 504 manages the user authentication data and the like, the data management section 600 of the voice controller 505 manages the above-mentioned variety of data and programs necessary for voice recognition. Further, the data management section 600 also stores response text data and voice synthesis dictionary data, which are used for feeding back voice to a user, in advance.

The voice recognition section 601 converts input voice data to the mobile terminal 10 to text data as a result of voice recognition, using a known voice recognition technique. For example, the voice recognition section 601 collates feature amounts, such as a waveform of input voice, expressed by input voice data, with the above-mentioned sound model and language model to extract a series of phonemes. Further, the voice recognition section 601 recognizes text expressed by the series of phonemes through morpheme analysis using the word dictionary data, syntax analysis, semantic analysis, and context analysis, and sets the recognized text as text data.

In the present embodiment, the text data obtained as a result of the above-described voice recognition is used for generation of a job command for instructing a job to be executed by the image forming apparatus 20.

The job command generation section 603 generates, based on characteristic words which are included in the text data obtained by the voice recognition section 601 and are used to control the image forming apparatus 20, a command for causing the functions of the image forming apparatus 20 to perform processing. Examples of the characteristic words mentioned here include words indicating the functions of the image forming apparatus 20, such as copy, scan, and print.

Further, the examples of the characteristic words also include numbers, such as one and two, each of which indicates the number of processing times of an associated one of the functions of the image forming apparatus 20, and copy/copies and sheet/sheets, which are often added to the end of text data. The job command generation section 603 converts these items to a data string determined in advance, and shapes the data string so as to make it possible to transmit the data string to the image forming apparatus 20. This data string is converted to data having a data size and an encryption level compliant with a communication standard used by the communication section 101 of the mobile terminal 10 for connection to an external apparatus, and the resulting data is transmitted to the external apparatus.

The voice synthesis section 602 synthesizes a response voice by converting the response text data to voice data which can be reproduced by the mobile terminal 10, using the response text data and voice synthesis dictionary data stored in the data management section 600.

Exchange of data generated by each of these functional blocks between the functional blocks is handled by the input/output controller 604.

The operations of the above-described functional blocks of the mobile terminal 10 and the whole operation of the information processing system 1 will be described hereinafter with reference to FIG. 9.

Next, the functional block of the voice controller 411 of the image forming apparatus 20 will be described with reference to FIG. 8.

Figure 8:
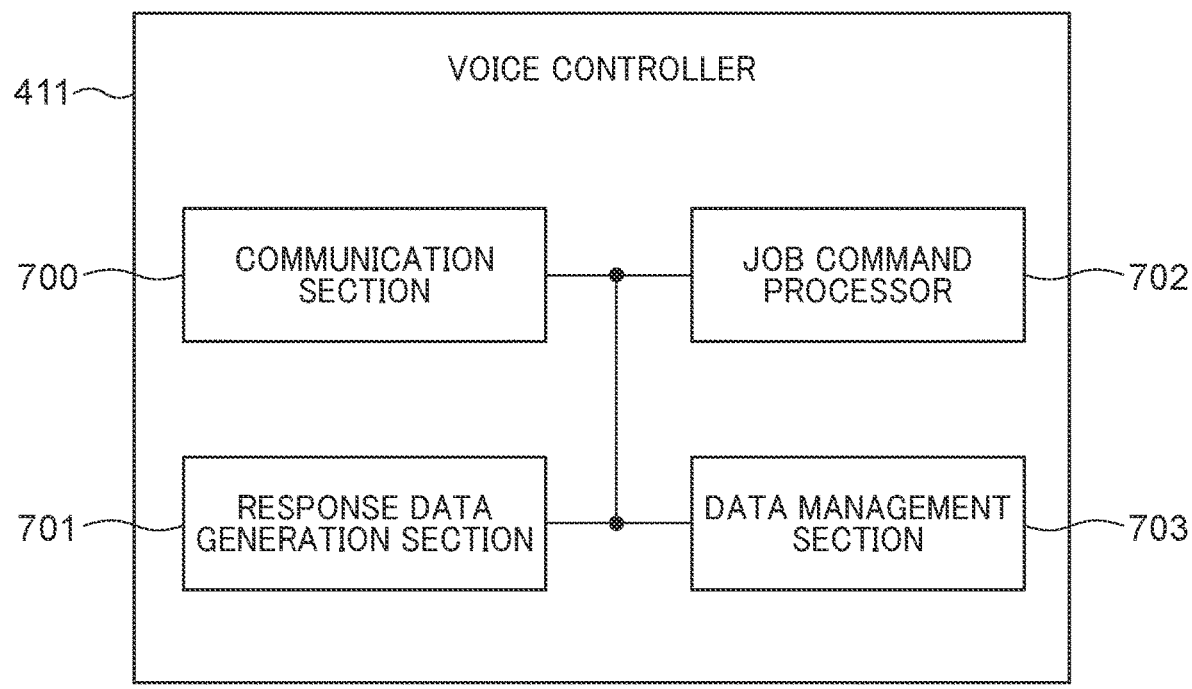
FIG. 8 is a detailed functional block diagram of a voice controller of the image forming apparatus shown in FIG. 5.

FIG. 8 is a detailed functional block diagram of the voice controller 411 of the image forming apparatus 20.

The voice controller 411 is comprised of a communication section 700, a response data generation section 701, a job command processor 702, and a data management section 703.

The communication section 700 is used as an interface for communication with hardware modules of the image forming apparatus 20 other than the voice controller 411. For example, the communication section 700 transmits a processing result of a job command received from the mobile terminal by USB communication, to the CPU 400 to thereby feed back the processing result to the variety of functions of the image forming apparatus 20.

The response data generation section 701 generates response data for feeding back an operation status of the image forming apparatus 20 to a user via the speaker 205 of the mobile terminal 10. Further, the response data generation section 701 is also used for generating data for prompting a user to input voice of an additional instruction. For example, in a case where a print job instructed by a user using voice input is finished, the response data generation section 701 is used to output a message of "print job is completed" as a response. In doing this, the response data generation section 701 receives an execution completion notification of the print job from the communication section 700 and reads out response data corresponding to the received notification from a data group of response data managed by the data management section 703. Then, the response data generation section 701 transmits the acquired response data to the communication section 700 to thereby transmit the data to the mobile terminal 10. In the present embodiment, the response data generated by the image forming apparatus 20 is text data (response text data).

The job command processor 702 converts a job command received from the mobile terminal 10 to data which can be processed by the image forming apparatus 20. Let it be assumed, for example, that a job command "print two copies" is transmitted from the mobile terminal 10 together with image data. At this time, the job command processor 702 divide the job command into data strings indicative of "print" and "two copies" determined in advance, and transmits a request for operating the image forming section 410 to obtain two sheets as a product, to the CPU 400 via the communication section 700. In a case where the job command processor 702 recognizes a request for a function which the image forming apparatus 20 does not have, the job command processor 702 notifies the response data generation section 701 of an error, obtains response data to cope with occurrence of the error, and feeds back the obtained response data to the mobile terminal 10.

The data management section 703 manages a data group for generating response data as described above. In the present embodiment, different from the mobile terminal 10, the image forming apparatus 20 does not receive voice input, and hence a sound model and a language model are not included in the data management section 703.

The flow of the above-described process will be described in detail with reference to FIG. 9. Note that in the following description, each processing step is abbreviated as S (step).

Figure 9:
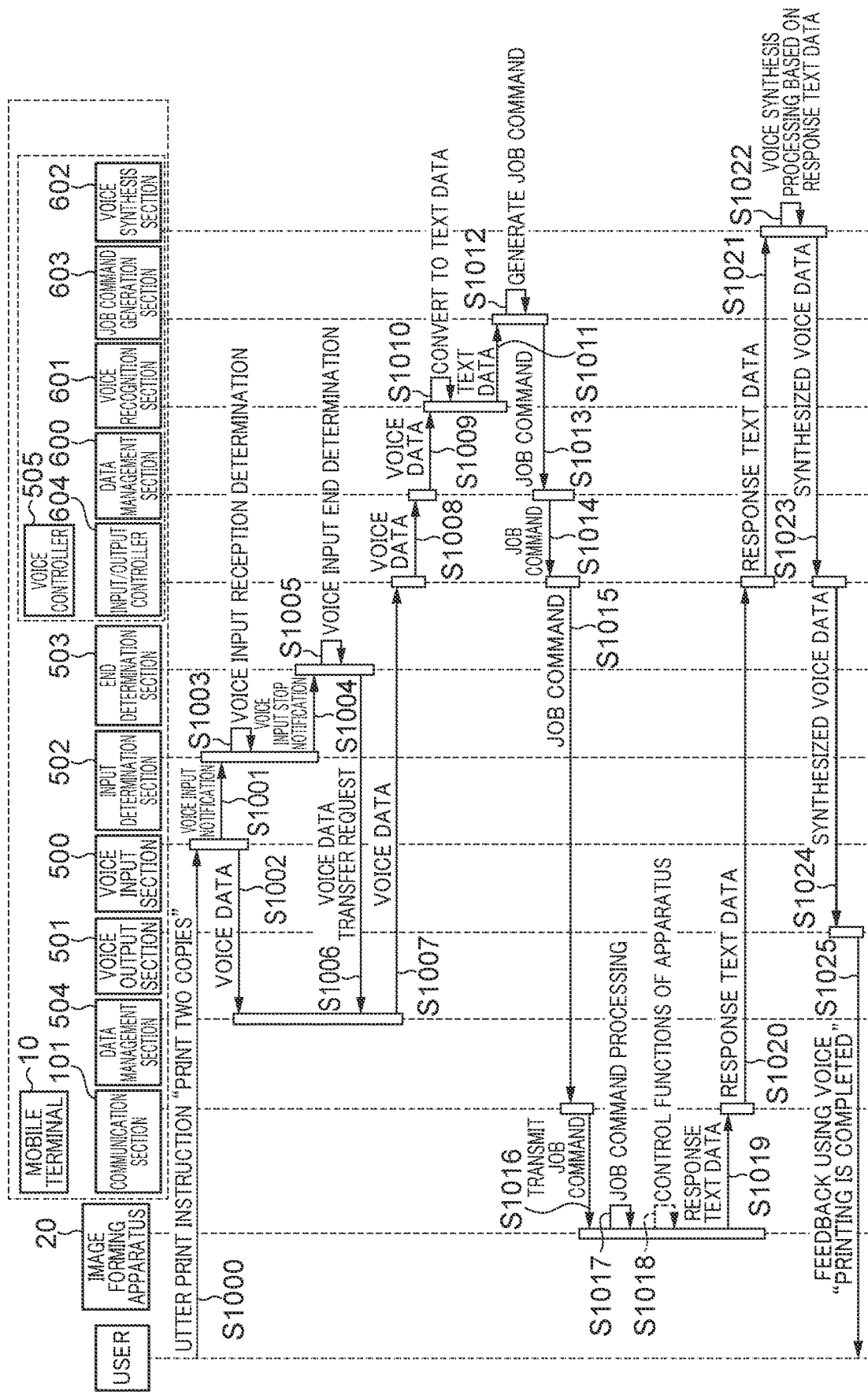
FIG. 9 is a detailed sequence diagram showing a flow of a process performed when the image forming apparatus is controlled using the mobile terminal as a voice interface.

FIG. 9 is a sequence diagram showing the flow of the process performed by the information processing system 1 according to the present embodiment when controlling the image forming apparatus 20 using the mobile terminal 10 as a voice interface.

In this sequence, the voice recognition application has already been started on the mobile terminal 10, and the connector 10*a* of the mobile terminal 10 has been attached to the pedestal 60 of the image forming apparatus 20 in a state in which voice input from a user can be performed. Although already described hereinabove, the connector 60*a* of the pedestal 60 of the image forming apparatus 20 and the connector 10*a* of the mobile terminal 10 are in a state enabled to perform USB communication.

Figure 10:
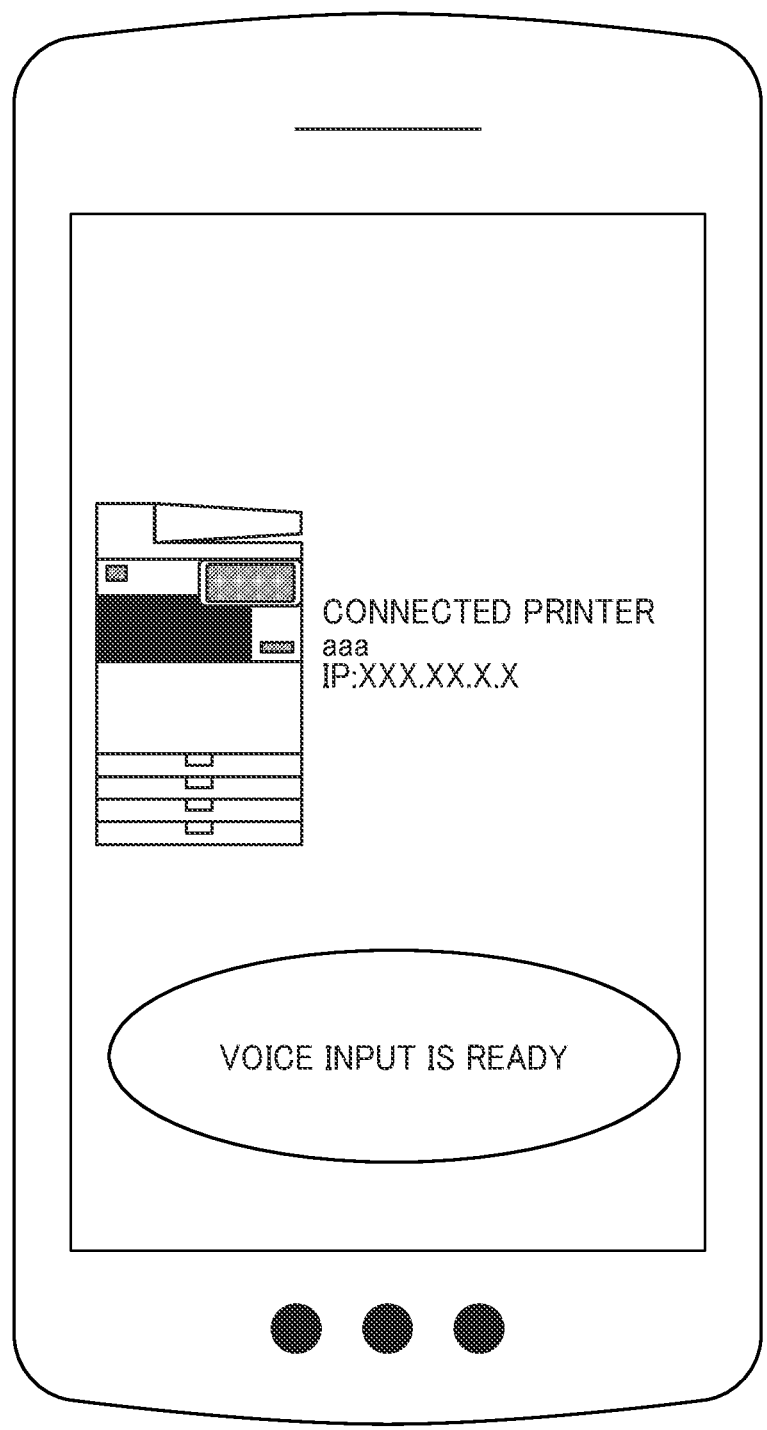
FIG. 10 is a diagram showing an example of a voice recognition application screen displayed on the mobile terminal when the process in FIG. 9 is started.

FIG. 10 shows an example of a voice recognition application screen displayed on the mobile terminal 10 when the process in FIG. 9 is started in the information processing system 1 according to the present embodiment.

As shown in FIG. 10, an appearance photograph and an apparatus name ("aaa" in the illustrated example in FIG. 10) of the image forming apparatus 20 to which the mobile terminal 10 is connected are displayed on the voice recognition application screen when the process in FIG. 9 is started. Further, in a case where the image forming apparatus 20 is connected by Ethernet, an IP address ("xxx.xx.x.x" in the illustrated example in FIG. 10) is displayed. Further, a user notification area is provided in a lower portion of the voice recognition application screen, and when notifying a user that voice input can be received, words of "voice input is ready" are displayed on the user notification area. On the other hand, when the mobile terminal 10 is feeding back voice to a user, for example, the display on the user notification area is changed to a display of "responding" to prevent the user from inputting voice.

In a step S1000, when a user starts an utterance to the mobile terminal 10 in a case where the words of "voice input is ready" are displayed on the user notification area of the voice recognition application screen, the process proceeds to a step S1001 for the voice input screen 500. The following description will be given of a case where the utterance of the user in the step S1000 is an instruction of "print two copies" of image data stored in the mobile terminal 10.

In the step S1001, the voice input section 500 passes a voice input notification indicating that the utterance of the user has started in the step S1000 to the input determination section 502 and the process proceeds to a step S1002.

In the step S1002, the voice input section 500 starts buffering of voice data of the utterance started by the user in the step S1000 into the data management section 504.

In a step S1003, according to the voice input notification in the step S1001, the input determination section 502 starts determination of whether or not there is a voice input. Here, in a case where the voice input from the user has stopped for a predetermined time period, the input determination section 502 transmits a voice input stop notification to the end determination section 503 (step S1004). Upon receipt of the voice input stop notification in the step S1004, the end determination section 503 determines that the voice input has ended (step S1005) and the process proceeds to a step S1006. Note that in the step S1001, the voice input section 500 may input the voice input notification not only to the input determination section 502, but also to the end determination section 503, and the end determination section 503 may determine whether or not the voice input from the user has stopped for the predetermined time period. For measurement of the predetermined time period, a timer, not shown, of the mobile terminal 10 is used.

In the step S1006, the end determination section 503 transmits a voice data transfer request to the data management section 504 so as to cause the voice data started to be buffered in the step S1002 to be transferred to the input/output controller 604, for execution of voice recognition and generation of a job command, described hereinafter.

In a step S1007, upon receipt of the voice data transfer request transmitted from the end determination section 503 in the step S1006, the data management section 504 terminates buffering of the voice data. Then, the data management section 504 transmits the buffered voice data to the input/output controller 604 and the process proceeds to a step S1008.

In the step S1008, the input/output controller 604 transmits the voice data transmitted from the data management section 504 in the step S1007 to the data management section 600 of the voice controller 505 and performs buffering in the voice controller 505.

In a step S1009, the data management section 600 transmits the voice data buffered in the step S1008 to the voice recognition section 601.

In a step S1010, the voice recognition section 601 sequentially converts the voice data transmitted from the data management section 600 in the step S1009 to text data and the process proceeds to a step S1011. For example, the voice recognition section 601 extracts a series of phonemes from the voice data using the above-mentioned sound model and language model, and analyzes the context of an utterance of the user based on the extracted phonemes using the word dictionary data held by the data management section 600. With this, the voice data is converted to one text data item.

In the step S1011, the voice recognition section 601 transmits the text data item into which the voice data is converted in the step S1010 to the job command generation section 603.

In a step S1012, the job command generation section 603 extracts information indicating functions and control of the image forming apparatus 20, such as "print" and "two copies", from the text data transmitted from the voice recognition section 601 in the step S1011. Then, based on the extracted information, the job command generation section 603 generates a job command with which the image forming section 410 of the image forming apparatus 20 can be controlled, and then the process proceeds to a step S1013.

In other words, the job command generation section 603 generates a job command with which the voice recognition application of the image forming apparatus 20 notifies the image forming section 410 of the start of a print job and the number of jobs to be processed. After the job command is generated, the job command generation section 603 proceeds to the step S1013.

In the step S1013, the job command generation section 603 transmits the job command generated in the step S1012 to the data management section 600 to perform buffering in the voice controller 505.

In a step S1014, the data management section 600 transmits the voice data buffered in the step S1013 to the input/output controller 604.

In a step S1015, the input/output controller 604 transmits the job command transmitted from the data management section 600 in the step S1014 to the communication section 101.

In a step S1016, the communication section 101 transmits the job command received in the step S1015 from the mobile terminal 10 to the image forming apparatus 20 via the wired communication section 208 connected to the image forming apparatus 20 such that USB communication can be performed. Here, the communication section 101 generates a data payload in which the job command is embedded and transmits the generated data payload to the wired communication section 408 of the image forming apparatus 20 according to the USB communication standard. The wired communication section 408 of the image forming apparatus 20 transmits the job command received from the mobile terminal 10 in the step S1016 to the CPU 400.

In a step S1017, upon receipt of the job command transmitted from the mobile terminal 10 via the wired communication section 408, the CPU 400 processes the received job command using the voice controller 411. More specifically, as described with reference to FIG. 8, the voice controller 411 controls the job command processor 702 to convert the job command received from the CPU 400 via the communication section 700 to data (command) with which the CPU 400 can control the variety of functions of the image forming apparatus 20. The voice controller 411 transmits the converted data to the CPU 400 via the communication section 700 again.

In a step S1018, the CPU 400 controls the image forming apparatus based on the data transmitted from the voice controller 411 in the step S1017 according to a program executed by the CPU 400 for control.

The job command is processed by the CPU 400, and as a result, the job instructed by the utterance of the user in the step S1000 is completed by the image forming apparatus 20. In this case, in the step S1018, the CPU 400 further instructs, via the communication section 700, the voice controller 411 to generate response text data of a response to the user. The voice controller 411 generates the response text data using the response data generation section 701 according to the instruction from the CPU 400. For example, in a case where the CPU 400 instructs generation of a response of "print job is completed", the voice controller 411 reads from the data management section 703 response text data corresponding to the above-mentioned response and converts the read text data to a desired format. The voice controller 411 transmits the converted response text data to the CPU 400 via the communication section 700.

In a step S1019, the CPU 400 transmits the response text data transmitted from the voice controller 411 in the step S1018 to the mobile terminal via the communication section 302.

In a step S1020, the communication section 101 of the mobile terminal 10 passes the response text data transmitted from the image forming apparatus 20 in the step S1019 to the input/output controller 604 of the voice controller 505.

In a step S1021, the input/output controller 604 passes the response text data transmitted from the communication section 101 in the step S1020 to the voice synthesis section 602 to perform voice synthesis. As a matter of course, the response text data may be buffered in the data management section 600 before this step.

In a step S1022, the voice synthesis section 602 performs voice synthesis on the response text data passed from the input/output controller 604 in the step S1021 and the process proceeds to a step 1023.

In the step S1023, the voice synthesis section 602 passes the voice data synthesized by the voice synthesis section 602 in the step S1022 to the input/output controller 604.

In a step S1024, the input/output controller 604 passes the synthesized voice data passed from the voice synthesis section 602 in the step S1023 to the voice output section 501.

In a step S1025, the voice output section 501 controls the voice controller 209 based on the voice data passed from the input/output controller 604 in the step S1024 to reproduce voice indicated by the response text data via the speaker 205. Here, as described above, voice saying "print job is completed" is fed back to the user.

With the above-described flow of the process illustrated by the sequence diagram shown in FIG. 9, it is possible for the user to control the image forming apparatus 20 with voice, using the mobile terminal 10.

Next, with reference to FIG. 11, the description will be given of data transfer performed in the information processing system 1 according to the present embodiment between the image forming apparatus 20 and the mobile terminal 10 using the USB.

The wired communication section 208 of the mobile terminal 10 and the wired communication section 408 of the image forming apparatus 20 are connected such that the USB communication can be performed. For this reason, data communication is performed between the wired communication sections 208 and 408 based on a transfer method defined by the USB standard. In the present embodiment, as shown in FIG. 11, controlled transfer including a vendor request which can be uniquely defined by a vendor and bulk transfer are supported.

Figure 11:
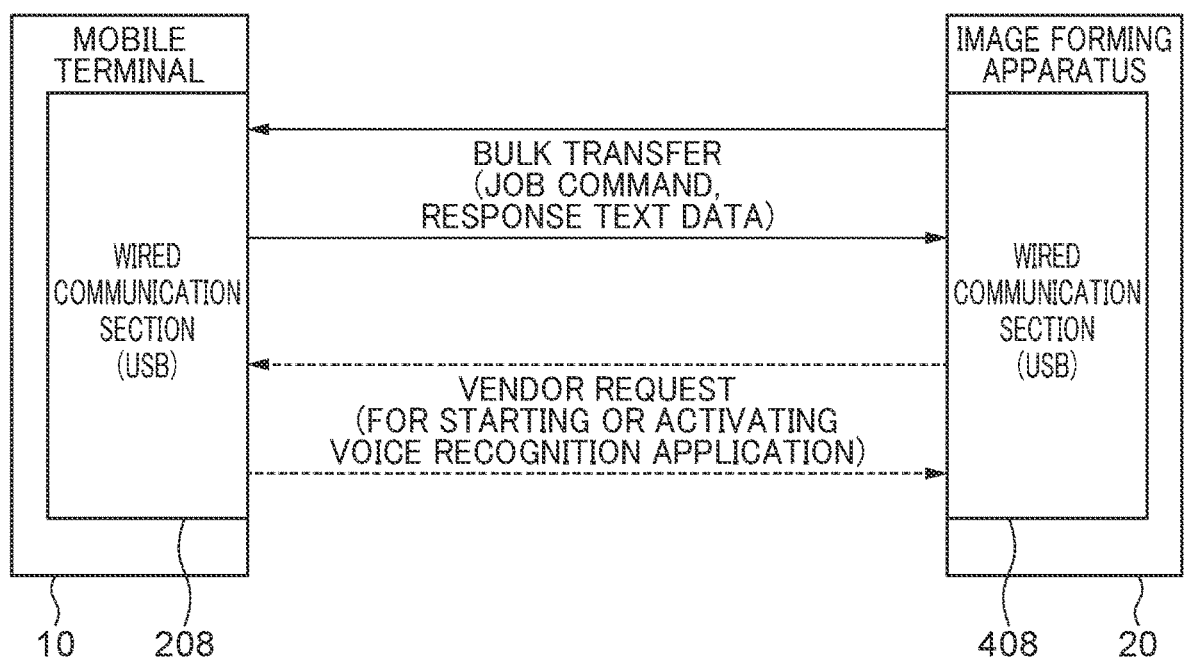
FIG. 11 is an outline diagram showing USB data transfer between the image forming apparatus and the mobile terminal.

There is a possibility that a mouse and a keyboard are connected to the image forming apparatus 20, and hence not only the communication methods shown in FIG. 11, but also interrupt transfer may be supported. However, isochronous transfer generally used for transferring e.g. video signals is not supported.

In the USB standard, when a USB device is connected, it is necessary to communicate information indicating a type of the connected device by controlled transfer. Also in the present embodiment, when the connector 10a of the mobile terminal 10 is attached to the connector 60a of the image forming apparatus 20, it is necessary to confirm the device connection condition. Therefore, the wired communication sections 208 and 408 are required to support a standard request and a class request.

On the other hand, in a case where a USB host causes a USB device to perform processing defined by a vendor, the function of the USB device can be expanded by defining a vendor request and embedding a device driver compliant with the vendor request. In the present embodiment, a vendor request is issued from the image forming apparatus 20 as the USB host to the mobile terminal 10 as the USB device. That is, as for the data transfer direction in the definition of the request, only a direction from the host to the device is supported. An arrow of the vendor request is also drawn in a direction from the mobile terminal 10 to the image forming apparatus 20 in FIG. 11 because this indicates that a response, such as an ACK (acknowledgement), to the vendor request from the host is transmitted. Although details will be described hereinafter with reference to FIG. 12, the vendor request in the present embodiment is a request for instructing the start of the voice recognition application installed in the mobile terminal 10 or activation of the voice recognition application (foreground operation). In the present embodiment, activation of the voice recognition application is realized by calling startActivity which is an application programming interface (API) in a case where a vendor request is received. However, activation of the voice recognition application depends on the OS of the mobile terminal 10, and hence this is not limitative.

Further, in the present embodiment, data having a relatively large data size is transferred, and hence the wired communication sections 208 and 408 also support bulk transfer. In the present embodiment, as shown in FIG. 11, bulk transfer is used when transferring the job command and the response text data which are described with reference to FIG. 9.

Details of the vendor request used in the present embodiment will be described below with reference to FIG. 12.

A field of bmRequestType indicates a type of the request. A value of bit 7 indicates a data transfer direction, a value of bit 6:5 indicates a request type, and a value of bit 4:0 indicates a request target. In the present embodiment, the data transfer direction is from the host to the device, the request type is the vendor request, and the request target is the device. Therefore, when the values are applied according to the USB standard, 01000000b is obtained.

A field of bRequest is a field for a value defining a type of the request. In the present embodiment, a value "0x01" indicating the vendor request to the mobile terminal 10 is defined as the value of bRequest.

A field of wValue is a field for defining a type of a control instruction given by the request defined by bRequest (vendor request in the present example). In the present embodiment, two values are defined as wValue. That is, the image forming apparatus 20 can provide two control instructions by using the vendor request. The first control instruction (first vendor request) is an instruction for starting the voice recognition application installed in the mobile terminal 10. The second control instruction (second vendor request) is an instruction for activating the voice recognition application installed in the mobile terminal 10. As the values of wValue, 0x0001 and 0x0002 are assigned to the first control instruction and the second instruction, respectively.

As a matter of course, a vendor request from the mobile terminal 10 to the image forming apparatus 20, and a vendor request from the image forming apparatus 20 to the mobile terminal 10, indicating another instruction, may be included.

A field of wIndex is used for notifying the device of an index and an offset, and a field of wLength specifies the number of bytes to be transferred in a case where a data stage exists. In the present embodiment, wIndex and wLength are not used, and hence both are set to a value of 0x0000.

Next, a flow of a process performed when the voice function of the mobile terminal 10 is enabled will be described with reference to a sequence diagram in FIG. 13.

This process is started when an attachment detection section (not shown) detects that the mobile terminal 10 has been attached to the pedestal 60 of the image forming apparatus 20. At this time, the person detection section 50 starts its operation, thereby starting periodic output of the ultrasonic waves 70. Note that the person detection section 50 may have already started its operation before the attachment detection section detects that the mobile terminal 10 has been attached to the pedestal 60. For example, the operation of the person detection section 50 may be started when the image forming apparatus 20 is powered on. The process performed for enabling the voice function of the mobile terminal 10 in a case where the voice recognition application has been started in the mobile terminal 10 will be described below with reference to FIG. 13, but the mobile terminal 10 is only required to have the voice recognition application installed thereon. For example, even in a case where the mobile terminal 10 is attached to the pedestal 60 in a state in which the voice recognition application has not been started, the process performed for enabling the voice function of the mobile terminal 10 can be executed. Details of the process in this case will be described hereinafter with reference to FIGS. 15 and 16.

In a step S2000, first, when a user comes close to the image forming apparatus 20, in a step S2001, the person detection section 50 of the image forming apparatus 20 detects the proximity of the user. More specifically, the person detection section 50 detects the proximity of the user, when output waves of the ultrasonic waves 70 being output are reflected from the user who is coming close to the image forming apparatus 20 and the reflected wave are input to the person detection section 50, and the process proceeds to a step S2002.

In the step S2002, the person detection section 50 outputs a notification indicating that the reflective wave has been received, to the console section 301. This notification includes information indicating a time at which the output waves were output from the person detection section 50 and a time at which the reflected waves were input to the person detection section 50. Further, the person detection section 50 periodically outputs output waves and outputs this notification to the console section 301 whenever reflected waves are received.

In a step S2003, in the console section 301, the CPU 406 of the console section 301 performs a user usage determination process based on a result of the detection performed by the person detection section 50. More specifically, whenever the notification is received from the person detection section 50, the CPU 406 calculates the above-mentioned time interval based on the information included in this notification. In a case where it is determined that the calculated time interval is shorter than a predetermined time period, and the notification from the person detection section 50 is repeatedly received for a predetermined time period or longer, the CPU 406 determines that the user has come close to use the image forming apparatus 20 and the process proceeds to a step S2004.

In the step S2004, the CPU 406 notifies the CPU 400 of the image forming apparatus controller 300 of a result of the determination in the step S2003.

In a step S2005, upon receipt of the notification transmitted from the CPU 406 in the step S2004, the CPU 400 transmits home screen drawing data to the CPU 406. However, the step S2005 is executed only in a case where the image forming apparatus 20 has been shifted to a power saving state, and the touch panel 405 of the console section 301 is not lighted.

In a step S2006, upon receipt of the drawing data transmitted from the CPU 400 in the step S2005, the CPU 406 displays the drawing data on the touch panel 405 of the console section 301.

After transmitting the home screen drawing data to the CPU 406 in the step S2005, in a step S2007, the CPU 400 confirms the connection condition of the USB device (connector 60a) controlled by the CPU 400. In this confirmation of connection of the USB device, the above-mentioned controlled transfer (not vendor request) is used. More specifically, this confirmation is performed based on whether or not a device class, a vendor identifier (ID), and a product ID, obtained by the controlled transfer, match values included in a list stored in advance. The list has been stored e.g. in the NAND flash 401 and is loaded into the DRAM 402 when the system of the image forming apparatus 20 is started. Here, a case where it is confirmed that the connector 10a of the mobile terminal 10 is connected to the connector 60a in the step S2007 will be described.

Next, the CPU 400 (instruction unit) transmits the vendor request defined in FIG. 11 from the CPU 400 to the CPU 200 of the mobile terminal 10 via the communication sections 302 and 101 (steps S2008 to 2010). Here, the CPU 400 transmits the vendor request including wValue set to 0x0002, i.e. an instruction for activating the voice recognition application installed in the mobile terminal 10, to the CPU 200, by way of example.

In a step S2011, upon receipt of the vendor request transmitted from the image forming apparatus 20 (CPU 400) in the steps S2008 to S2010, the CPU 200 determines values defined by the vendor request, using software operating thereon. As a matter of course, what type of vendor request is to be transmitted from the image forming apparatus 20 is defined in advance, and the software of the mobile terminal 10 is implemented based on this. Here, as a result of the determination, the CPU 200 determines that a value defined in the vendor request (value in the field of wValue in the vendor request) is 0x0002.

In a step S2012, the CPU 200 activates the voice recognition application based on a result of the determination in the step S2011 that the value in the field of wValue is 0x0002, and when the activation is completed, the process proceeds to a step S2013. In a case where the voice recognition application has already been operated in the foreground, the step S2012 is omitted.

In the step S2013, the CPU 200 transmits a voice response request to the voice controller 505. This is performed in order to feed back the fact that the mobile terminal 10 has completed reception of the voice input from the user.

After that, steps S2014 to 2016 are executed. Note that the voice synthesis processing (step S2014) has been described in detail in the step S1022 in FIG. 9, and hence the description thereof is omitted here. Similarly, reproduction of the synthesized voice data (steps S2015 and S2016) has been described in detail in the steps S1023 to S1025 in FIG. 9, and hence the description thereof is omitted here. Here, in the step S2016, the voice output section 501 (first notification unit) of the mobile terminal 10 performs feedback to the user with a message that "reception of voice input is started". The feed-back method is not limited to the method of the present embodiment insofar as it is possible to notify a user that the mobile terminal 10 is enabled to respond to voice input. For example, not voice, but words, such as "voice input is ready", may be displayed on the mobile terminal 10 (touch panel 206: notification unit), as shown on the voice recognition application screen in FIG. 10, for execution of feedback.

After the above-described process is terminated, the user can start a voice operation as described with reference to FIG. 9 for the mobile terminal 10.

Next, details of the processes executed by the CPUs 200, 400, and 406, respectively, in the sequence diagram in FIG. 13 will be described with reference to FIGS. 14 to 16.

Figure 13:
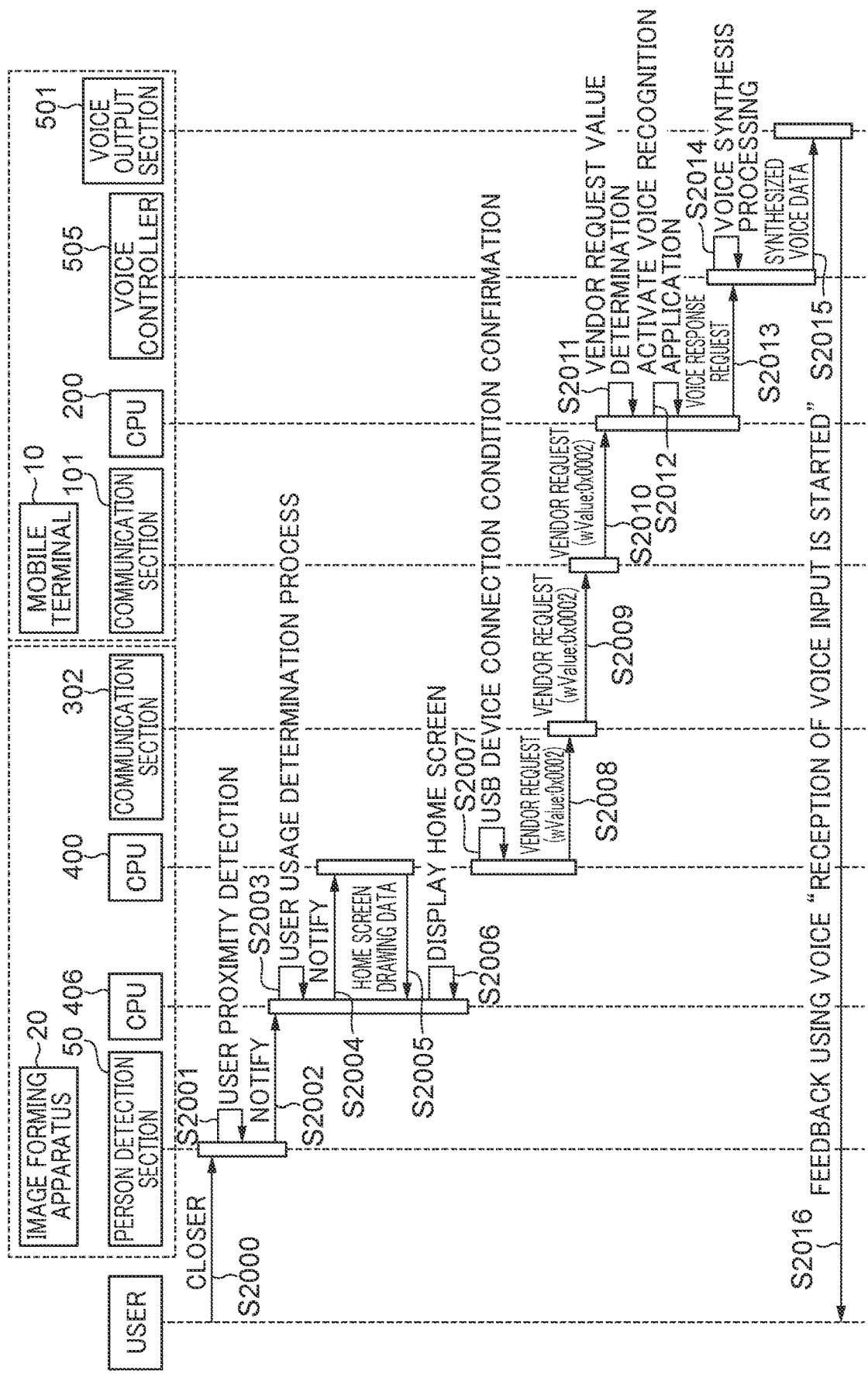
FIG. 13 is a detailed sequence diagram showing a flow of a process performed when the image forming apparatus enables the voice function of the mobile terminal.
Figure 14:
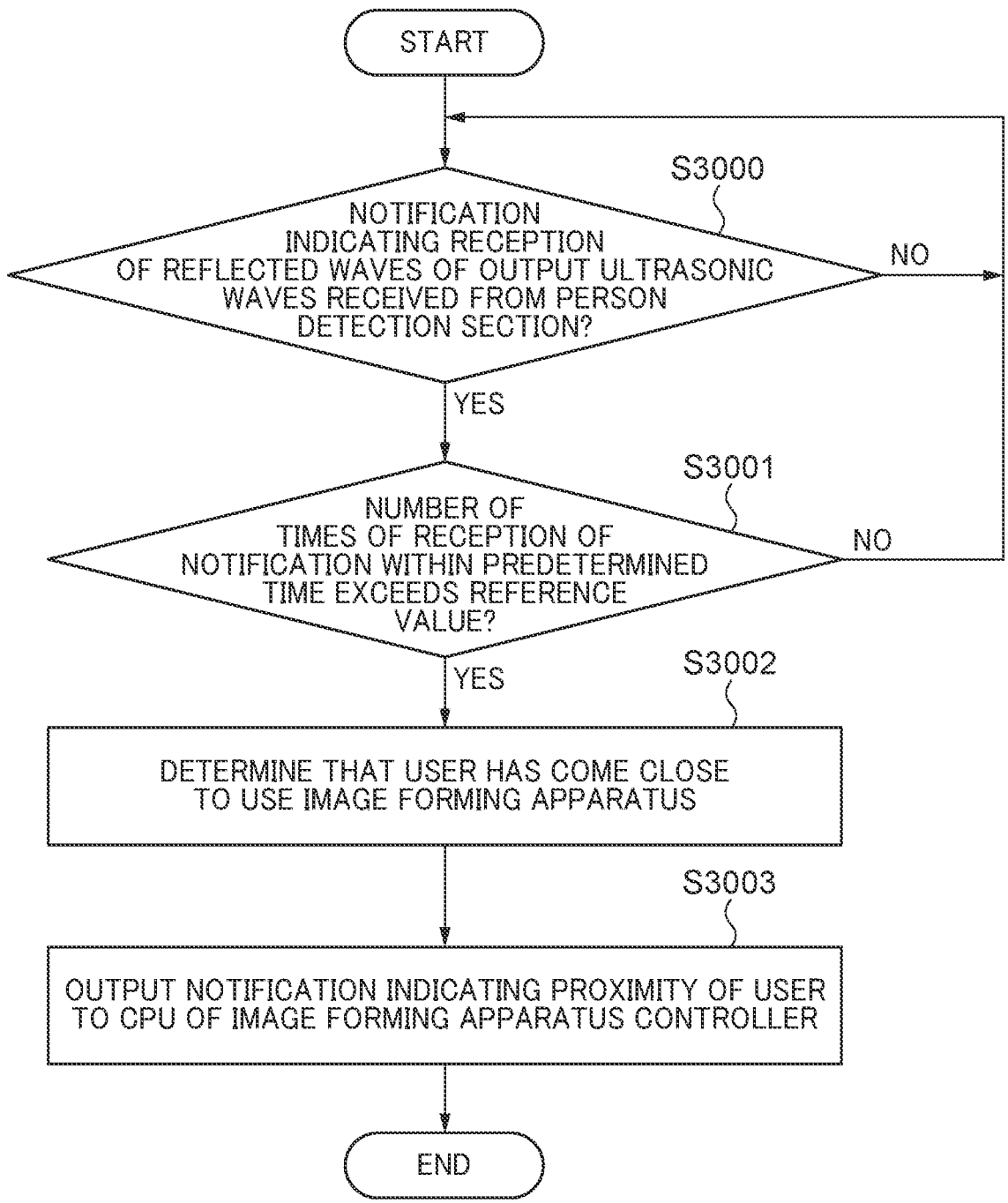
FIG. 14 is a flowchart of a user usage determination process performed by a CPU included in a console section of the image forming apparatus in a step in the process shown in FIG. 13.

FIG. 14 is a flowchart of the user usage determination process performed by the CPU 406 of the console section 301 of the image forming apparatus 20 in the step S2003 in FIG. 13.

In a step S3000, first, the CPU 406 waits for receipt of a notification that the ultrasonic waves reflected from the user (reflected waves) are received, from the person detection section 50 (second notification unit). Upon receipt of this notification, the process proceeds to a step S3001.

In the step S3001, the CPU 406 determines whether or not the number of times of reception of notification from the person detection section 50 has exceeded a predetermined number of times (reference value) within a predetermined time period. Let us consider, for example, a case where the predetermined time period is one second, and the ultrasonic waves 70 are output from the person detection section 50 every 100 ms. If the person detection section 50 has received no reflected waves within the predetermined time period (user has not been detected), the number of times of reception of notification from the person detection section 50 is zero. In a case where the user has passed in front of the image forming apparatus 20 within the predetermined time period, the number of times of reception of notification from the person detection section 50 is one or two. In a case where the user has come close to the image forming apparatus 20 and stopped in front of the image forming apparatus 20, the number of times of reception of notifications becomes closer to ten. Here, the predetermined number of times is set to seven, and in a case where the number of times of reception of notification from the person detection section 50 is seven or more (not smaller than the predetermined number of times), the process proceeds to a step S3002.

In the step S3002, the CPU 406 determines that the user has come close to use the image forming apparatus 20, and the process proceeds to a step S3003. As a matter of course, the above-mentioned predetermined time period and predetermined number of times are only examples and may be changed depending on a sensor system that detects reflected waves of the ultrasonic waves or an environment (humidity and temperature).

In the step S3003, the CPU 406 notifies the CPU 400 of the image forming apparatus controller 300 that the user has come close to the image forming apparatus 20, followed by terminating the present process.

Figure 15:
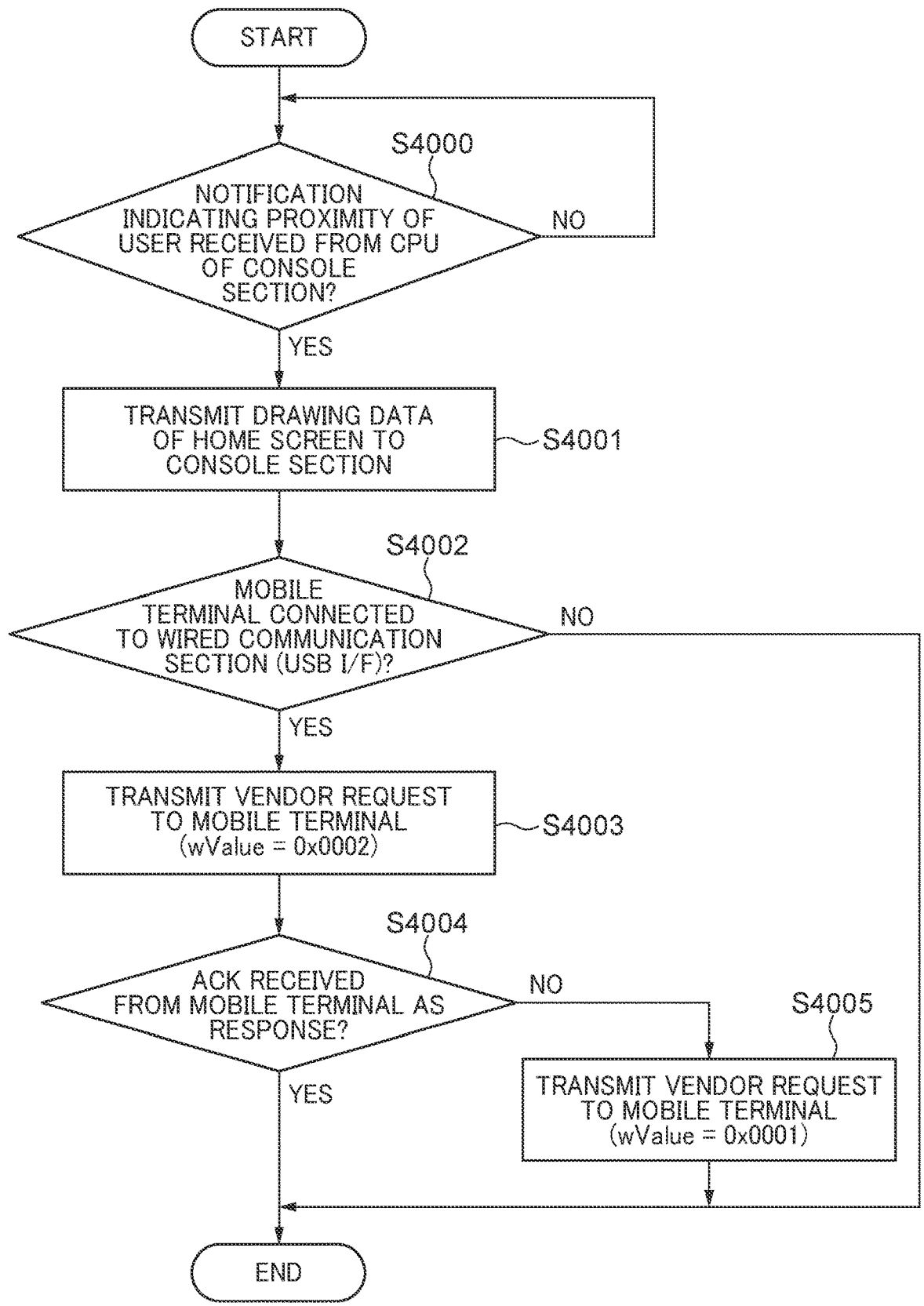
FIG. 15 is a flowchart of a process performed by a CPU included in an image forming apparatus controller of the image forming apparatus when a notification as a result of the user usage determination process in FIG. 14 is received.

FIG. 15 is a flowchart of the process performed by the CPU 400 of the image forming apparatus controller 300 of the image forming apparatus 20 in a case where a notification is received in the step S3003 in FIG. 14.

In a step S4000, the CPU 400 waits for receipt of a notification indicating the proximity of the user, and upon receipt of this notification from the CPU 406, the process proceeds to a step S4001.

In the step S4001, the CPU 400 transmits the home screen drawing data to the CPU 406 of the console section 301 and the process proceeds to a step S4002.

In the step S4002, the CPU 400 determines whether or not the connector 10a of the mobile terminal 10 is connected to the wired communication section 408 (connector 60a as the USB interface) by controlled transfer. If the connector 10a of the mobile terminal 10 is not connected (NO to the step S4002), the present process is terminated. On the other hand, if the mobile terminal 10 is connected (YES to the step S4002), the process proceeds to a step S4003.

In the step S4003, the CPU 400 transmits the above-described vendor request to the mobile terminal 10 (operation of a first transmission unit), and then proceeds to a step S4004. Here, it is assumed that the value in the field of wValue in the vendor request is set to 0x0002 indicating activation of the voice recognition application.

In the step S4004, the CPU 400 determines whether or not the vendor request transmitted to the mobile terminal 10 in the step S4003 has been normally processed by the mobile terminal 10. More specifically, the CPU 400 determines whether or not an ACK (response command indicating that the communication has been normally completed, used in the USB controlled transfer) has been received from the mobile terminal 10. If the ACK has been received (YES to the step S4004), the present process is terminated. On the other hand, not the ACK, but a command NAC (negative acknowledgement) indicating abnormality of communication has been received (NO to the step S4004), the CPU 400 determines that there is a possibility that the voice recognition application has been terminated by a user who has used the application before, so that the process proceeds to a step S4005.

In the step S4005, the CPU 400 transmits a vendor request to the mobile terminal 10 (operation of a second transmission unit). The value in the field of wValue in this vendor request is set to 0x0001 for instructing the start of the voice recognition application. After that, the present process is terminated.

FIG. 16 is a flowchart of the process performed by the CPU 200 of the mobile terminal 10 when the vendor request has been received from the CPU 400 in one of the step S4003 and the step S4005 in FIG. 15.

First, in a step S5000, the CPU 200 waits for receipt of a vendor request, which is transmitted from the CPU 400 in one of the steps S4003 and S4005 in FIG. 15, and upon receipt of the vendor request, the process proceeds to a step S5001.

In the step S5001, the CPU 200 determines a value in the field of wValue in the vendor request received in the step S5000. If the value in the field of wValue is 0x0001 (YES to the step S5001), the process proceeds to a step S5002, wherein the CPU 200 starts the voice recognition application installed in the software operating thereon (on the CPU 200). On the other hand, if the value in the field of wValue is not 0x0001 but 0x0002 (NO to the step S5001), the process proceeds to a step S5003, wherein the CPU 200 transmits an ACK command to the image forming apparatus 20 as a response and execute activation of the voice recognition application. Note that in the step S5003, activation of the voice recognition application cannot be executed in a case where the voice recognition application has not been started, and hence the CPU 200 transmits a NAK command to the image forming apparatus 20 as a response, so that the process returns to the step S5000.

When the processing operation in the step S5002 or S5003 is completed, the process proceeds to a step S5004, wherein the CPU 200 controls the voice recognition application according to the sequences in FIGS. 9 and 11 to notify the user that receipt of voice input is started, followed by terminating the present process.

With the above-described control, in the information processing system 1, even in a case where the user does not carry the mobile terminal 10 but the mobile terminal 10 is attached to the pedestal 60 of the image forming apparatus 20, the user can start using the voice function of the mobile terminal 10 only by approaching the image forming apparatus 20.

Note that in the present embodiment, the present invention can also be realized by supplying a program that realizes one or more functions to a system or a computer of an apparatus via a network or a recording medium, and causing the system or a system controller of the apparatus to perform a process executed by loading the program. The system controller can have one or a plurality of processors or circuits and include a network of a plurality of separate system controllers or a plurality of separate processors or circuits so as to load and execute executable commands.

The processors or circuits can include a central processing unit (CPU), a micro processing unit (MPU), a graphics processing unit (GPU), an application-specific integrated circuit (ASIC), and a field programmable gate array (FPGA). Further, the processors or circuits can include a digital signal processor (DSP), a data flow processor (DFP), or a neural processing unit (NPU).

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-076610 filed May 6, 2022, which is hereby incorporated by reference herein in its entirety.

What is claimed is:

1. An information processing system including an information processing apparatus and a mobile terminal that is capable of performing wired or wireless communication with the information processing apparatus,
wherein a voice recognition application is installed in the mobile terminal,
wherein the information processing apparatus comprises:
an attachment section to which the mobile terminal is attached;
a sensor that detects an approach of a person; and
one or more controllers including one or more processors and one or more memories, the one or more controllers configured to:
set the sensor to ON in a state where the mobile terminal is attached to the attachment section and set the sensor to OFF in a state where the mobile terminal is not attached to the attachment section; and
send the mobile terminal an instruction to start the voice recognition application or operate the voice recognition application in the foreground, in a state where the sensor is set to ON and a person approaches the information processing apparatus, and
wherein the mobile terminal comprises:
a user interface configured to notify a user that the mobile terminal is ready to respond to voice input, when the instruction is received,
wherein the information processing apparatus has a wired communication function compliant with communication standard of USB,
wherein the instruction is defined by using a vendor request which is one of controlled transfers, and
wherein the one or more controllers are further configured to:
transmit a first vendor request for instructing start of the voice recognition application to the mobile terminal, and
transmit a second vendor request for instructing a foreground operation of the voice recognition application to the mobile terminal in a case where a NAK is received from the mobile terminal as a response to the first vendor request.

2. The information processing system according to claim 1, wherein the information processing apparatus has a wireless communication function compliant with at least one of communication standards of Wi-Fi, NFC, and Bluetooth.

3. The information processing system according to claim 1, wherein the sensor is an ultrasonic motion sensor.

4. The information processing system according to claim 1, wherein the one or more controllers are further configured to:
cause the sensor to, when an operation of the sensor is started, periodically detect an approach of a person;
notify, when an approach of a person is detected by the sensor, the mobile terminal of a result of detection by the sensor, and
determine that a person approaches the information processing apparatus, in a case where an approach of a person is notified to the mobile terminal a predetermined number of times or more within a predetermined time period.

5. An information processing apparatus that is capable of performing wired or wireless communication with a mobile terminal in which a voice recognition application is installed, comprising:
an attachment section to which the mobile terminal is attached;
a sensor that detects an approach of a person; and one or more controllers including one or more processors and one or more memories, the one or more controllers configured to:
  set the sensor to ON in a state where the mobile terminal is attached to the attachment section and set the sensor to OFF in a state where the mobile terminal is not attached to the attachment section; and
  send the mobile terminal an instruction to start the voice recognition application or operate the voice recognition application in the foreground, in a state where the sensor is set to ON and a person approaches the information processing apparatus,
wherein the information processing apparatus has a wired communication function compliant with communication standard of USB,
wherein the instruction is defined by using a vendor request which is one of controlled transfers, and
wherein the one or more controllers are further configured to:
  transmit a first vendor request for instructing start of the voice recognition application to the mobile terminal, and
  transmit a second vendor request for instructing a foreground operation of the voice recognition application to the mobile terminal in a case where a NAK is received from the mobile terminal as a response to the first vendor request.

6. A method of controlling an information processing apparatus that is capable of performing wired or wireless communication with a mobile terminal in which a voice recognition application is installed, and includes an attachment section to which the mobile terminal is attached, and a sensor that detects an approach of a person, the method comprising:
  setting the sensor to ON in a state where the mobile terminal is attached to the attachment section and setting the sensor to OFF in a state where the mobile terminal is not attached to the attachment section; and
  instructing the mobile terminal to start the voice recognition application or operate the voice recognition application in the foreground, in a state where the sensor is set to ON and a person approaches the information processing apparatus,
wherein the information processing apparatus has a wired communication function compliant with communication standard of USB,
wherein the instructing is defined by using a vendor request which is one of controlled transfers,
wherein a first vendor request for instructing start of the voice recognition application is transmitted to the mobile terminal, and
wherein a second vendor request for instructing a foreground operation of the voice recognition application is transmitted to the mobile terminal in a case where a NAK is received from the mobile terminal as a response to the first vendor request.

7. A non-transitory computer-readable storage medium storing a program for causing a computer to execute a method of controlling an information processing apparatus that is capable of performing wired or wireless communication with a mobile terminal in which a voice recognition application is installed, and includes an attachment section to which the mobile terminal is attached, and a sensor that detects an approach of a person, the method comprising:
  setting the sensor to ON in a state where the mobile terminal is attached to the attachment section and setting the sensor to OFF in a state where the mobile terminal is not attached to the attachment section; and
  instructing the mobile terminal to start the voice recognition application or operate the voice recognition application in the foreground, in a state where the sensor is set to ON and a person approaches the information processing apparatus,
wherein the information processing apparatus has a wired communication function compliant with communication standard of USB,
wherein the instructing is defined by using a vendor request which is one of controlled transfers,
wherein a first vendor request for instructing start of the voice recognition application is transmitted to the mobile terminal, and
wherein a second vendor request for instructing a foreground operation of the voice recognition application is transmitted to the mobile terminal in a case where a NAK is received from the mobile terminal as a response to the first vendor request.

* * * * *